US012658810B2

(12) United States Patent
Binqadhi et al.

(10) Patent No.: US 12,658,810 B2
(45) Date of Patent: Jun. 16, 2026

(54) FAULT CURRENT CONTROL OF THREE-PHASE DUAL ACTIVE BRIDGE DC-DC CONVERTER EMPLOYING A NOVEL MODIFIED ASYMMETRICAL DUTY CYCLE CONTROL MODULATION

(71) Applicant: KING FAHD UNIVERSITY OF PETROLEUM AND MINERALS, Dhahran (SA)

(72) Inventors: Hamed Mohammed Abdullah Binqadhi, Dhahran (SA); Md Ismail Hossain, Dhahran (SA); Mohamed Ali Yousef Abido, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 252 days.

(21) Appl. No.: 18/639,246

(22) Filed: Apr. 18, 2024

(65) Prior Publication Data
US 2025/0330097 A1    Oct. 23, 2025

(51) Int. Cl.
*H02M 3/335* (2006.01)
(52) U.S. Cl.
CPC .............................. *H02M 3/33573* (2021.05)
(58) Field of Classification Search
CPC ......... H02M 3/33573; H02M 3/33584; H02M 1/0058; H02M 1/32
USPC ....................................................... 363/141
See application file for complete search history.

(56) References Cited

U.S. PATENT DOCUMENTS

| 10,608,522 | B2 * | 3/2020 | De Doncker | ......... H02M 1/088 |
| 11,404,966 | B2 * | 8/2022 | Kim | .................... H02M 1/0064 |
| 2024/0162804 | A1 * | 5/2024 | Singh | ................ H02M 3/33573 |

FOREIGN PATENT DOCUMENTS

| CN | 106033932 B | 7/2018 | |
| CN | 110943606 B | 10/2020 | |
| CN | 115912935 A | 4/2023 | |
| EP | 4007148 A1 * | 6/2022 | ........ H02M 3/33584 |

OTHER PUBLICATIONS

Hu et al. ; Closed-Form Asymmetrical Duty-Cycle Control to Extend the Soft-Switching Range of Three-Phase Dual-Active Bridge Converters ; IEEE Transactions on Power Electronics ; Jan. 2021 ; 15 Pages.

* cited by examiner

*Primary Examiner* — Yemane Mehari
(74) *Attorney, Agent, or Firm* — Oblon, McClelland, Maier & Neustadt, L.L.P.

(57) ABSTRACT

A three-phase dual active bridge (DAB) converter for efficient power management and modulation in diverse operational conditions includes a primary side bridge and a secondary side bridge linked by a three-phase medium-frequency transformer. A microcontroller is employed to regulate the converter's power flow by initiating the system to align the secondary bridge's DC output voltage with a predetermined reference voltage. Upon detecting a deviation of the DC output voltage from a set threshold, indicative of a fault, the microcontroller calculates distinct duty cycles for the primary and secondary bridges, as well as a load angle, considering the system's voltage ratio and phase position.

15 Claims, 21 Drawing Sheets

202-B ⌇ Spa 1
204-B ⌇ Ssa 0

206-B ⌇ Spb 1
208-B ⌇ Ssb 0

210-B ⌇ Spc 1
212-B ⌇ Ssc 0

214-B ⌇ upa 0
216-B ⌇ usa

218-B ⌇ ipa 0

$\theta1$  $\theta2$  $2\pi/3$     $4\pi/3$      $2\pi$ 1200                 1204

1400

FAULT CURRENT CONTROL OF THREE-PHASE DUAL ACTIVE BRIDGE DC-DC CONVERTER EMPLOYING A NOVEL MODIFIED ASYMMETRICAL DUTY CYCLE CONTROL MODULATION

STATEMENT OF ACKNOWLEDGEMENT

Support received from the Interdisciplinary Research Center for Renewable Energy and Power Systems (IRC-REPS), Research Institute, King Fahd University of Petroleum & Minerals (KFUPM), Saudi Arabia through Grant No. INRE2314 is gratefully acknowledged.

BACKGROUND

Technical Field

The present disclosure is directed to a field of direct current distribution system, more particularly to a three-phase dual active bridge converter system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The ever-increasing demand for electrical energy in recent years has emphasized implementing sustainable energy resources for power generation. The integration of renewable energy sources, such as photovoltaic power, wind power, and fuel cells, into the global energy matrix has necessitated the enhancement of direct current (DC) power transmission and distribution systems at varied voltage levels. Isolated bidirectional DC-DC converters have become instrumental in interfacing these distributed resources efficiently. Specifically, dual active bridges (DAB) based isolated converters are extensively used in applications like electric vehicle (EV) charging and discharging.

DC power microgrids have demonstrated numerous advantages over their alternating current (AC) counterparts, including improved efficiency, lower costs, reduced complexity, superior power quality, enhanced safety, and a greater power transmission ratio. Despite these benefits, DC grids face critical protection challenges, particularly with the rapid increase of fault currents, a consequence of the low inherent resistance in DC systems. To address these challenges, DAB DC-DC converters have attracted significant research interest due to their superior fault response capabilities.

DABs confer multiple advantages, crucial for the protection of DC grids. These include galvanic isolation, provided by the transformer, which separates the main power source from the output; fault detection capabilities; the ability to control and limit current; fault-tolerant capacity (FTC); and the support for breaker-less protection techniques.

The three-phase DAB converter, compared to the single-phase version, achieves a higher power density and requires a smaller DC-link filter. Nevertheless, the standard single-phase shift control method in the three-phase DAB poses risks during faults, including dangerously high peak currents that can damage the semiconductor switches. To manage the power flow in three-phase DAB converters, various modulation techniques have been proposed, such as those employing multiple phase shifts including triangular and trapezoidal current modulation techniques.

An alternative method for the three-phase DAB involves using multiple phase-shift controls alongside parallel phase operations. This method, however, introduces a larger ripple in the DC-link current and higher device turn-off currents than three-phase operations, necessitating precise synchronization for the parallel phases to ensure even current distribution. In efforts to expand the ZVS capabilities of the three-phase DAB, a method utilizing simultaneous pulse-width modulation (PWM) with variable duty cycles has been proposed. This method has the drawback of overlapping ZVS ranges, which leads to a significant difference in RMS currents. Consequently, a modulation strategy using iterative optimization algorithms has been recommended to select the best operation mode and lower the RMS current. This process, however, is limited to offline execution with a requisite look-up table for implementing the control parameters, which may constrain the control performance and robustness of the three-phase DAB in various situations.

In high-power applications of the three-phase DAB, to achieve effective ZVS soft switching, an additional resonant commutated pole (ARCP) circuit with lossless snubbers has been integrated. This technique requires instantaneous ZVS detection and accurate control-timing calculations for full efficacy. Moreover, the auxiliary circuit in this method suffers from additional power losses and is incapable of reducing the RMS current during significant voltage fluctuations. For broadened voltage range applications, a single-phase DAB converter with a tap changer-based transformer has been proposed. Nonetheless, dynamic selection and control of tap changer switches in practical situations remain a challenge.

Additionally, there have been developments in the single-phase DAB converter that integrate an auxiliary inductor alongside semiconductor components, which can dynamically modify the virtual magnetizing inductance during light load conditions. Despite its applicability to the three-phase DAB, this method is marred by significant power losses and does not lower RMS current with notable voltage changes.

The single-phase shift (SPS) modulation method, which adjusts only the phase for power flow control, also shows its limitations. In the event of short circuit faults at the output, the phase currents on both sides of the DAB increase, and the standard DC current leads to substantial switching losses. Additionally, soft switching is limited to eighteen out of twenty-four instances for the twelve switch on/off cycles. In dynamic scenarios, such SPS modulation can lead to excessive overshoots and DC bias in the phase currents of the transformer, potentially stressing semiconductor devices, causing magnetic saturation in series-connected inductors, and negatively impacting the functionality of dynamic controls. Adjustments to the time constant, based on the transformer's winding resistance and leakage inductance, have been applied to mitigate overshoot currents.

Alternatively, the asymmetrical duty cycle control (ADCC) technique uses both phase shift and duty cycle adjustments for power flow control. Different but interdependent duty cycles for each bridge regulate the phase currents on both sides of the three-phase DAB during faults, effectively reducing the DC fault current compared to normal conditions and thereby limiting current stress. Nevertheless, the ADCC is constrained in its power transfer capabilities at lower DC voltages and is ineffective at a zero-volt fault, rendering it unsuitable for DC Fault Ride Through (FRT) operations. Furthermore, soft switching with ADCC occurs in eighteen out of twenty-four switching instances for the twelve switches.

In the method known as variable duty cycle single-phase shift modulation, adjustments in phase and duty cycle are used to control power flow. This technique effectively regulates the phase current on both sides of the DAB when faults occur at the output terminal, resulting in a DC fault current that is significantly less than the nominal DC current. Moreover, this method allows for soft switching during twelve out of twenty-four switching instances for the twelve switches, which can mitigate the detrimental effects on switch performance.

For broadened voltage ranges, the single-phase DAB converter with a tap changer-based transformer is implemented. However, the dynamic control of tap changer switches remains complex. Additionally, integrating auxiliary inductors with semiconductor components to dynamically alter the virtual magnetizing inductance has been considered, but with a significant energy loss trade-off.

The single-phase shift (SPS) modulation scheme also poses a few limitations, especially during short circuit faults where it induces high switching losses and potential magnetic saturation due to DC bias in the phase currents. In dynamic conditions, rapid load angle changes in SPS modulation can lead to current overshoots, putting additional strain on power semiconductor devices and affecting dynamic control functionalities.

Each of the existing technologies suffers from one or more drawbacks hindering their adoption. Accordingly, it is one object of the present disclosure to provide a system and method for efficiently controlling the peak current and providing high output current, all the while ensuring the converter switches operate with soft switching.

SUMMARY

In an exemplary embodiment of the present disclosure, a method to control a three-phase dual active bridge converter system having a primary side and a secondary side is disclosed. The method includes initializing the three-phase dual active bridge converter system to ensure a DC output voltage on the secondary side is equal to a reference voltage, measuring a peak phase current on the secondary side ($i_{sDC,peak}$) to obtain a reference peak current in a normal operation condition, measuring and comparing the DC output voltage to a threshold voltage to determine a fault condition, calculating a first duty cycle ($D_p$), a second duty cycle ($D_s$), and a load angle ($\varphi$) based on a three-phase dual active bridge voltage ratio, a phase position, and the peak phase current.

The method further includes sending a modulation signal based on the first duty cycle, the second duty cycle, and the load angle in response to the fault condition to control the power flow of the three-phase dual active bridge converter system.

The first duty cycle is independent of the second duty cycle.

In one aspect of the present disclosure, the step of calculating the first duty cycle further includes calculating the first phase angle ($\theta_1$), the second phase angle ($\theta_2$), and the third phase angle ($\theta_3$) based on a first equation, a second equation, and a third equation. According to the method:

the first equation is $2\theta_1 - \theta_2 - \frac{1}{2}d\theta_3 + d\pi = 0$;

4

-continued the second equation is $\theta_2 - \theta_3 + \frac{2\pi}{3} - \frac{1}{2}d\theta_3 + d\frac{\pi}{3} = 0$; and the third equation is $i_{sDC,peak}(\theta) = \frac{U_p}{3\omega L}\left[\theta_2 + d\theta_1 - 2d\theta_2 + \frac{1}{2}d\theta_3 + d\frac{\pi}{3}\right]$;

where d is the three-phase dual active bridge voltage ratio, $U_p$ is a primary DC voltage, $\omega$ is an angular switching frequency, and $\theta$ is a phase angle.

The method further includes calculating the first duty cycle ($D_p$), the second duty cycle ($D_s$), and the load angle ($\varphi$) based on a fourth equation, a fifth equation, and a sixth equation. Where, the fourth equation is $D_p = \theta_2$;

the fifth equation is $D_s = \theta_3 - \theta_1$; and the sixth equation is $\varphi = \frac{1}{2}(\theta_3 + \theta_1 - \theta_2)$.

In one aspect of the present disclosure, the three-phase dual active bridge converter system is controlled by a single-phase shift control method under a normal operation condition.

In one aspect of the present disclosure, the three-phase dual active bridge converter system has a plurality of switches. Each of the plurality of switches includes a soft-switching technique.

In one aspect of the present disclosure, the three-phase dual active bridge system further includes a three-phase medium-frequency transformer having a winding configuration configured to link the primary side bridge and the secondary side bridge and a microcontroller.

In one aspect of the present disclosure, the modulation signal is configured to restrict the power flow represented by a primary side AC phase current less than a predetermined current limit.

In accordance with the exemplary embodiment of the present disclosure, a three-phase dual active bridge (DAB) converter is disclosed. The DAB converter includes a primary side bridge, a secondary side bridge, a three-phase medium-frequency transformer having a winding configuration configured to link the primary side bridge and the secondary side bridge, and a microcontroller configured to modulate a power flow of the three-phase dual active bridge converter by a modulation method.

The modulation method includes initializing the three-phase dual active bridge converter system to ensure a DC output voltage of the secondary side bridge is equal to a reference voltage, measuring a peak phase current of the secondary side bridge ($i_{sDC,peak}$) to obtain a reference peak current in a normal operation condition, measuring and comparing the DC output voltage to a threshold voltage to determine a fault condition, calculating a first duty cycle ($D_p$), a second duty cycle ($D_s$), and a load angle ($\varphi$) based on a three-phase dual active bridge voltage ratio, a phase position, and the peak phase current, and sending a modulation signal based on the first duty cycle, the second duty cycle, and the load angle in response to the fault condition to modulate the power flow. The first duty cycle is independent of the second duty cycle.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
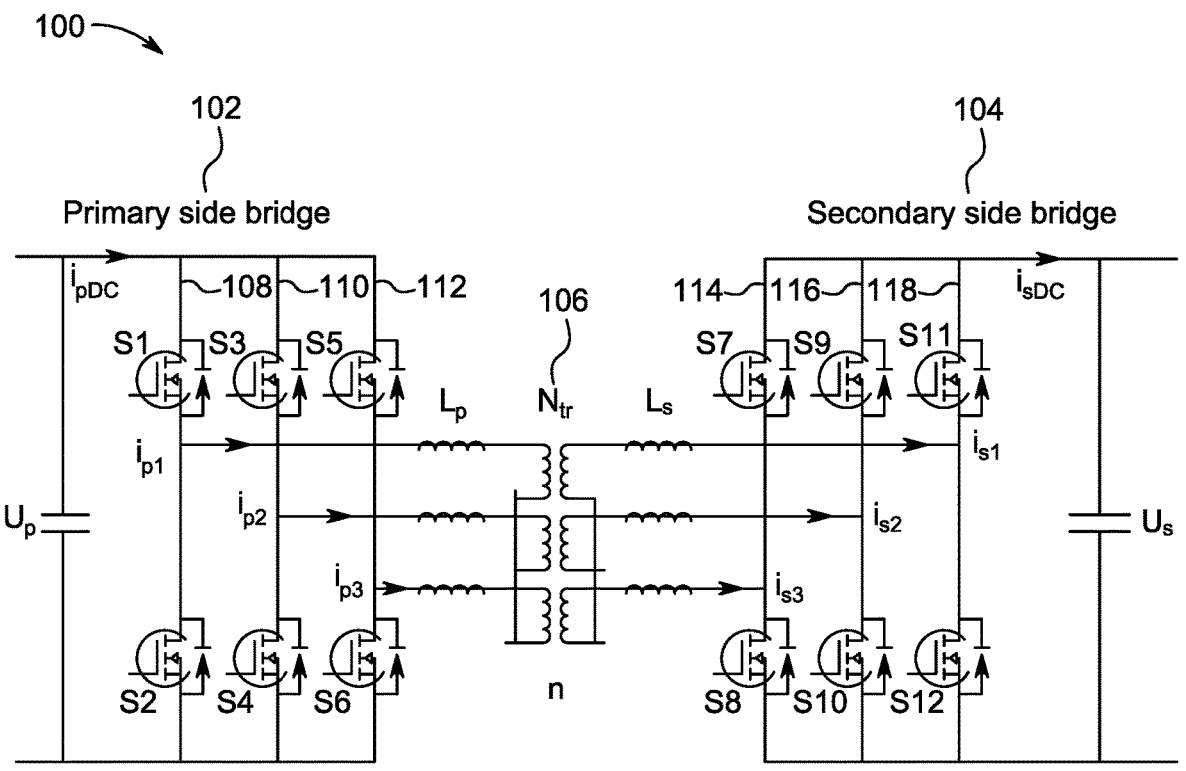
FIG. 1 illustrates a schematic diagram of a three-phase dual active bridge (DAB) DC-DC converter, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a three-phase dual active bridge (DAB) converter. The DAB converter is implemented in high-power settings. Conventional modulation methods for the three-phase DAB have challenges, such as elevated peak currents, limitations in very low voltage ratios, and constraints on output current. The present disclosure relates to a modified asymmetrical duty cycle control (MADCC) technique designed to facilitate fault ride-through operations of the three-phase DAB. With autonomous control variables, the MADCC method manages peak current and supports high output currents while ensuring that the converter's switches engage in soft switching.

FIG. 1 illustrates a schematic diagram of a three-phase dual active bridge (DAB) DC-DC converter, in accordance with one embodiment of the present disclosure. The three-phase dual active bridge (DAB) DC-DC converter 100, also referred as to the DAB converter 100 hereinafter, is configured of two three-phase bridges linked by a medium-frequency three-phase transformer 106. The DAB converter 100 includes, but may not be limited to, a primary side 102 bridge, a secondary side 104 bridge, a three-phase medium-frequency transformer 106, and a microcontroller.

In one aspect, the three-phase medium-frequency transformer 106 of the DAB converter 100 has a winding configuration configured to link the primary side 102 bridge and the secondary side 104 bridge. The winding configuration is selected from the group of various configurations, such as Y/Y, Δ/Δ, or Y/Δ.

Each of the primary side 102 bridge and the secondary side 104 bridge is composed of three arms that are configured for conducting the current through the transformer 106. The primary side 102 bridge includes a set of arms having semiconductor switches.

In one aspect of the present disclosure, the primary side 102 bridge includes three arms, each arm having a pair of switches connected in series, where three arms are implemented in parallel to each other. First arm 108 of the primary side 102 bridge includes two switches, S1 and S2. Second arm 110 of the primary side 102 bridge includes two switches, S3 and S4. Third arm 112 of the primary side 102 bridge includes two switches, S5 and S6.

In one aspect of the present disclosure, the secondary side 104 bridge includes three arms, each arm having a pair of switches connected in series, where three arms are implemented in parallel to each other. First arm 114 of the secondary side 104 bridge includes two switches, S7 and S28. Second arm 116 of the secondary side 104 bridge includes two switches, S9 and S10. Third arm 118 of the secondary side 104 bridge includes two switches, S11 and S12.

The primary side 102 bridge and the secondary side 104 bridge are linked by the medium-frequency three-phrase transformer 106, referred to as a transformer 106 hereinafter. In one aspect of the present disclosure, the transformer 106's winding configuration is Y/Y configuration. In the Y/Y connection, each primary and secondary winding is connected to a neutral point. The neutral point may or may not be brought out to an external physical connection and the neutral may or may not be grounded.

The current flow on the primary side 102 is denoted by $i_{pDC}$, which flows through the respective bridge arms before passing through the transformer 106 to the secondary side. The current $i_{pDC}$ flowing through the first arm is denoted by $i_{p1}$, through the second arm is denoted by $i_{p2}$, and through the third arm is denoted by $i_{p3}$. The current passing through the transformer 106 to the secondary side 104 is denoted by $i_{sDC}$. The current $i_{sDC}$ flowing through the first arm is denoted by $i_{s1}$, through the second arm is denoted by $i_{s2}$, and through the third arm is denoted by $i_{s3}$. The voltage on the primary side 102 of the transformer 106 is denoted as $U_p$, while the voltage on the secondary side 104 is denoted as $U_s$. The transformer 106 is configured for the effective transformation of power between the two voltage levels, with a turn ratio of 'n', which determines the voltage conversion ratio of the DAB converter 100.

The switches implemented on each arm are semiconductor devices. In one aspect of the present disclosure, the switches are configured using an n-channel metal-oxide-semiconductor field-effect transistor (MOSFET). Switches are implemented for enabling the control of power flow and providing the means for bidirectional energy transfer. The configuration of these switches is integral to the operation of the DAB converter 100, allowing for the modulation of power flow between the primary and secondary sides.

The converter configuration accommodates various modulation techniques for controlling the power flow that enhances the converter's efficiency and reliability. Various modulation techniques employed for controlling three-phase DAB systems include, but may not be limited to, a single phase shift and an asymmetrical duty cycle control.

Figure 2A:
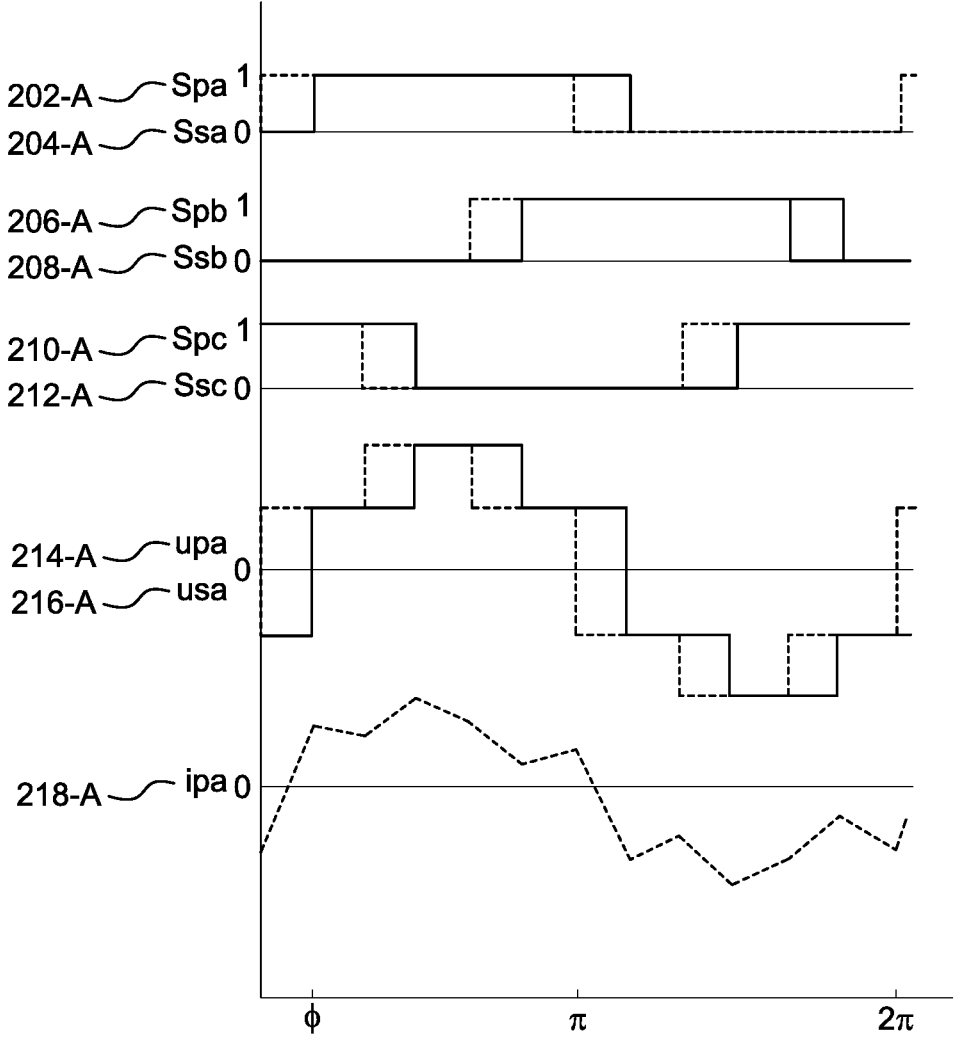
FIG. 2(A) illustrates waveforms of Switching states, AC voltages, and primary AC current of the three-phase DAB corresponding to the single phase-shift modulation method, according to certain embodiments.

FIG. 2(A) illustrates waveforms of Switching states, AC voltages and primary AC current of the three-phase DAB corresponding to the single phase-shift modulation method, in certain embodiment.

In the single phase-shift modulation method, the two bridges are modulated with a fixed frequency and a 50% duty cycle. Therefore, the controllable factor is the phase shift (p) between the modulation signals of the three-phase DAB. Essentially, the modulation signal of the secondary bridge is shifted by φ compared to the modulation signal of the primary bridge. By adjusting this phase angle φ, the power transferred from the primary to the secondary sides of the three-phase DAB can be controlled as follows:

$$P_{SPS} = \begin{cases} \dfrac{dU_P^2}{2\pi f L_\sigma}\left(\dfrac{2\varphi}{3} - \dfrac{\varphi^2}{2\pi}\right) & 0 \le \varphi \le \dfrac{\pi}{3} \\[3mm] \dfrac{dU_P^2}{2\pi f L_\sigma}\left(\varphi - \dfrac{\varphi^2}{\pi} - \dfrac{\pi}{18}\right) & \dfrac{\pi}{3} < \varphi \le \dfrac{\pi}{2} \end{cases} \quad (1)$$

Where d is the three-phase DAB voltage ratio described by $$d = \frac{NU_S}{U_P},$$

N is the turns ratio of the transformer, $L_\sigma$ is the total leakage inductance of the transformer referred to the primary side i.e. $L_\sigma = L_P + N^2 L_S$, f is the switching frequency. For $$|\varphi| = \frac{\pi}{2},$$

maximum power can be transferred, but having $$\frac{\pi}{3} < |\varphi| \le \frac{\pi}{2}$$

results in a large reactive power which affects the system's efficiency. Therefore, the magnitude of the load angle is usually kept less than $$\frac{\pi}{3}.$$

Based on the switching states of the primary and secondary switches, Sp and Ss, the transformer generates three-phase voltages through each bridge, representing the primary voltage $u_p$ and secondary voltage $u_s$. These voltages have four distinct levels:

$$\pm \frac{U_P}{3} \text{ and } \pm \frac{2U_P}{3}$$

for the primary bridge, and $$\pm \frac{U_S}{3} \text{ and } \pm \frac{2U_S}{3}$$

for the secondary bridge, as illustrated in FIG. 2(A). Up and Us correspond to the primary and secondary DC-link voltages, respectively.

The SPS modulation enables Zero-Voltage Switching (ZVS) during the turning on of switches, coinciding with the conduction of corresponding anti-parallel diodes. ZVS is highly desirable as it effectively reduces switching losses and minimizes electromagnetic interference noises. In SPS, the ZVS regions are identified based on the voltage ratio and the corresponding transferred power of the three-phase DAB.

During low-voltage or zero-voltage fault conditions, the three-phase DAB converter maintains the same output current through the utilization of SPS modulation. However, reducing the voltage ratio leads to a significant increase in both peak and rms currents in the semiconductor devices. Additionally, in the low voltage-ratio state, the load angle becomes ineffective in efficiently controlling the output current, as depicted in (1). The most unfavorable scenario occurs in zero-voltage faults, where the three-phase DAB converter's output current becomes independent of the load angle $\varphi$. Moreover, the secondary bridge switches experience hard-switching turn-on when operating at low voltage-ratio settings. This situation subjects the semiconductor devices to heat stress and electromagnetic interference (EMI) disturbances, potentially causing damage. Consequently, SPS modulation is incompatible with the functioning of DC fault ride-through (FRT) capabilities.

Referring back to FIG. 2 (A), the $S_{pa}$ 202-A indicates switching state of first arm of the primary side bridge, where $S_{sa}$ 204-A indicates switching state of first arm of the secondary side bridge. Similarly, the $S_{pb}$ 206-A indicates switching state of second arm of the primary side bridge, where $S_{sab}$ 208-A indicates switching state of second arm of the secondary side bridge. Similarly, the $S_{pc}$ 210-A indicates switching state of third arm of the primary side bridge, where $S_{sab}$ 212-A indicates switching state of third arm of the secondary side bridge. $U_{pa}$ 214-A presents AC voltage waveform of the primary side bridge, and $U_{sa}$ 216-A presents AC voltage waveform of the secondary side bridge. $i_{pa}$ 218-A illustrates primary AC current of the three-phase DAB corresponding the SPS modulation method.

Thus, the SPS control method depicted in FIG. 2(A) shows how the system operates during standard and low or zero-voltage fault conditions. Under standard conditions, the power transfer is managed efficiently through the careful adjustment of $\varphi$. However, in the event of a voltage drop or fault, the system maintains its output current.

Furthermore, the control limitations of SPS modulation become apparent in low voltage-ratio states or during zero-voltage faults, where the output current is no longer influenced by the phase shift, rendering the system vulnerable to hard-switching events and potential damage from increased thermal and electromagnetic stresses.

Figure 2B:
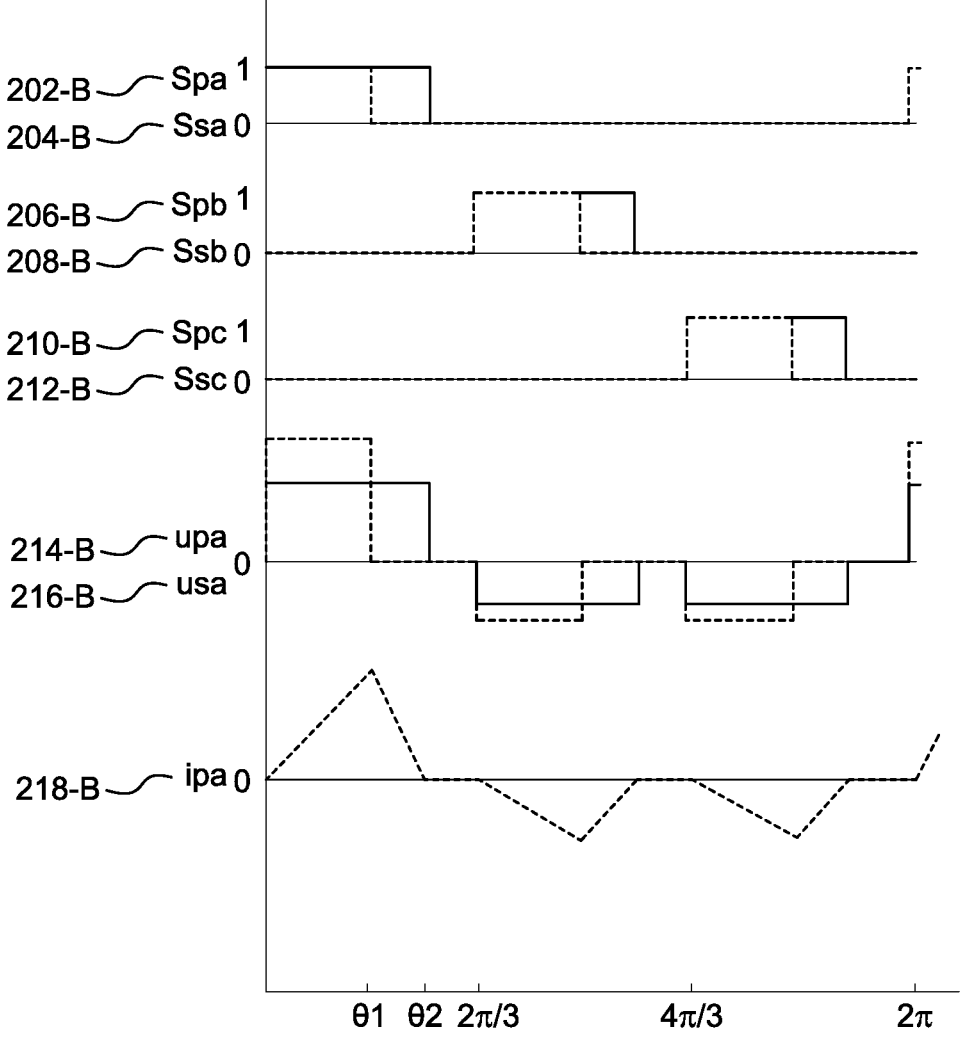
FIG. 2(B) illustrates waveforms of Switching states, AC voltages, and primary AC current of the three-phase DAB corresponding to the asymmetrical duty cycle control method, according to certain embodiments.

FIG. 2(B) illustrates waveforms of Switching states, AC voltages and primary AC current of the three-phase DAB corresponding to the asymmetrical duty cycle control method, in certain embodiment.

The asymmetrical duty cycle control (ADCC) can expand the operating voltage ranges, where soft-switching operation can be still maintained. Further, the ADCC is configured to minimize the rms current under light-load scenarios. The ADCC is based on regulating the duty cycle of the primary $D_p$ and secondary $D_s$ bridges ranging from 0 to one third of the switching period. For more efficient control of transformer current and transferred power, $D_p$ and $D_s$ offer two extra degrees of freedom in addition to the load angle between the primary and secondary bridge.

The three-phase triangular current modulation buck mode (TCM3-Buck) is the most suitable mode for fault operations as it is applied in light load conditions to step down the input voltage. In this mode and referring to FIG. 2(*b*), the primary and secondary duty cycles can be written in terms of the phase position $\theta$ as $$D_p = \frac{\theta_1}{2\pi} \text{ and } D_S = \frac{\theta_2}{2\pi}.$$

Also, the angle $\varphi$ represents the phase difference between the centers of the switching states of the primary and secondary bridges Sp and Ss and it is given by $$\varphi = \frac{\theta_2 - \theta_1}{2}.$$

The rms current passing through the transformer windings is obtained in terms of the load angle $\varphi$ as follows:

$$i_{pa} = \frac{dU_p\varphi}{3\pi fL_\sigma} \sqrt{\frac{2\varphi}{(1-d)\pi}} \tag{2}$$

$$P_{TMC3-Buck} = \frac{d^2 U_p^2 \varphi^2}{\pi^2 fL_\sigma (1-d)} \tag{3}$$

Referring back to FIG. 2(B), the $S_{pa}$ 202-B indicates the switching state of first arm of the primary side bridge, where $S_{sa}$ 204-B indicates the switching state of first arm of the secondary side bridge. Similarly, the $S_{pb}$ 206-B indicates the switching state of second arm of the primary side bridge, where $S_{sa}$ b 208-B indicates the switching state of second arm of the secondary side bridge. Similarly, the $S_{pc}$ 210-B indicates the switching state of third arm of the primary side bridge, where $S_{sab}$ 212-B indicates the switching state of third arm of the secondary side bridge. $U_{pa}$ 214-B presents AC voltage waveform of the primary side bridge, and $U_{sa}$ 216-B presents AC voltage waveform of the secondary side bridge. $i_{pa}$ 218-B illustrates primary AC current of the three-phase DAB corresponding the asymmetrical duty cycle control method.

Figure 2C:
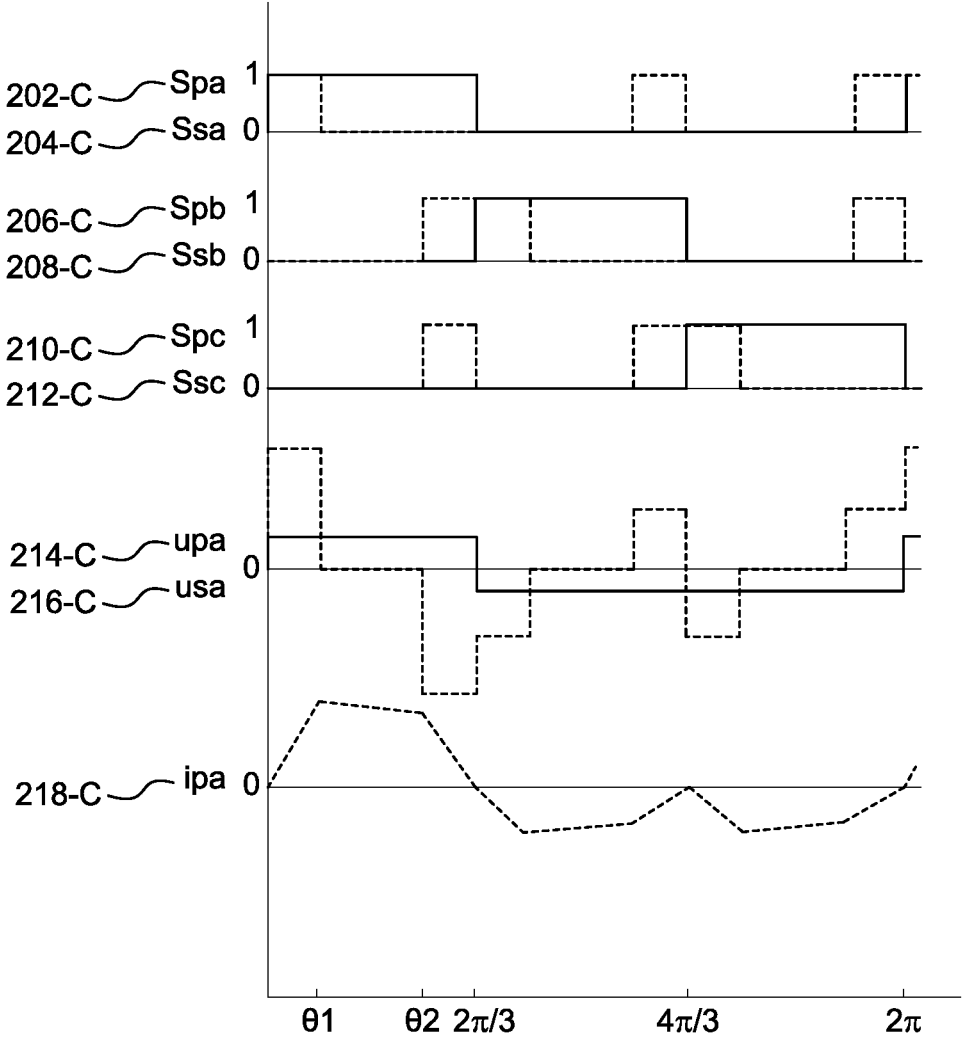
FIG. 2(C) illustrates waveforms of Switching states, AC voltages, and primary AC current of the three-phase DAB corresponding to a Space-Vector-based Asymmetrical Duty-Cycle Control method, according to certain embodiments.

FIG. 2(C) illustrates waveforms of Switching states, AC voltages and primary AC current of the three-phase DAB corresponding to a Space-Vector-based Asymmetrical Duty-Cycle Control method, in certain embodiment.

To address the limitations of the ADCC in handling faults and to enable the three-phase DAB converter to withstand zero-voltage faults, the Space-Vector-based Asymmetrical Duty-Cycle Control method was implemented. The Space-Vector-based Asymmetrical Duty-Cycle Control method is based upon the Three-Level Converter Modulation (TCM3)-Buck approach. The TCM3-Buck refers to a topology used in power electronic converters which combines TCM3 with a Buck converter configuration. TCM3 involves using three voltage levels instead of the conventional two in the modulation of power switches. By integrating TCM3 with the Buck converter topology, the TCM3-Buck method aims to enhance the efficiency and performance of power electronic systems, particularly in applications such as power supplies, motor drives, and renewable energy systems.

The TCM3-Buck method adds the usage of the primary bridge's opposing voltage vector in addition to the original primary and secondary voltage vectors. The new voltage vector is applied during one-third of the switching time to control the transformer current, as illustrated in FIG. 2(C). Consequently, the primary duty cycle $D_p$ increases while the soft-switching operation is still maintained. Meanwhile, the duty cycle of the secondary bridge $D_s$ is fixed at ⅓ to maximize the DC output current.

The maximum value of the primary phase current is obtained to be:

$$i_{pa}(\theta_1) = \frac{dU_p\varphi}{3\pi f L_\sigma}\sqrt{\frac{2\varphi}{(1-d)\pi}} \qquad (4)$$

And the maximum delivered power and current are given by:

$$P_{FRT-Buck,MAX} = \frac{d(1-d)^2 - U_p^2}{18 f L_\sigma} \qquad (5)$$

$$\overline{i_{sDC,,max}} = \frac{(1-d^2) - U_p}{18 f L_\sigma} \qquad (6)$$

The method can deliver high output current, close to normal, at zero-voltage faults. However, it has only one control parameter which is $D_p$.

Referring back to FIG. 2 (C), the $S_{pa}$ 202-C indicates the switching state of first arm of the primary side bridge, where $S_{sa}$ 204-C indicates the switching state of first arm of the secondary side bridge. Similarly, the $S_{pb}$ 206-C indicates the switching state of the second arm of the primary side bridge, where $S_{sab}$ 208-C indicates the switching state of the second arm of the secondary side bridge. Similarly, the $S_{pc}$ 210-C indicates the switching state of the third arm of the primary side bridge, where $S_{sab}$ 212-C indicates the switching state of the third arm of the secondary side bridge. $U_{pa}$ 214-C presents the AC voltage waveform of the primary side bridge, and $U_{sa}$216-C presents the AC voltage waveform of the secondary side bridge. $i_{pa}$218-C illustrates the primary AC current of the three-phase DAB corresponding to the Space-Vector-based asymmetrical duty-cycle control method.

Figure 3:
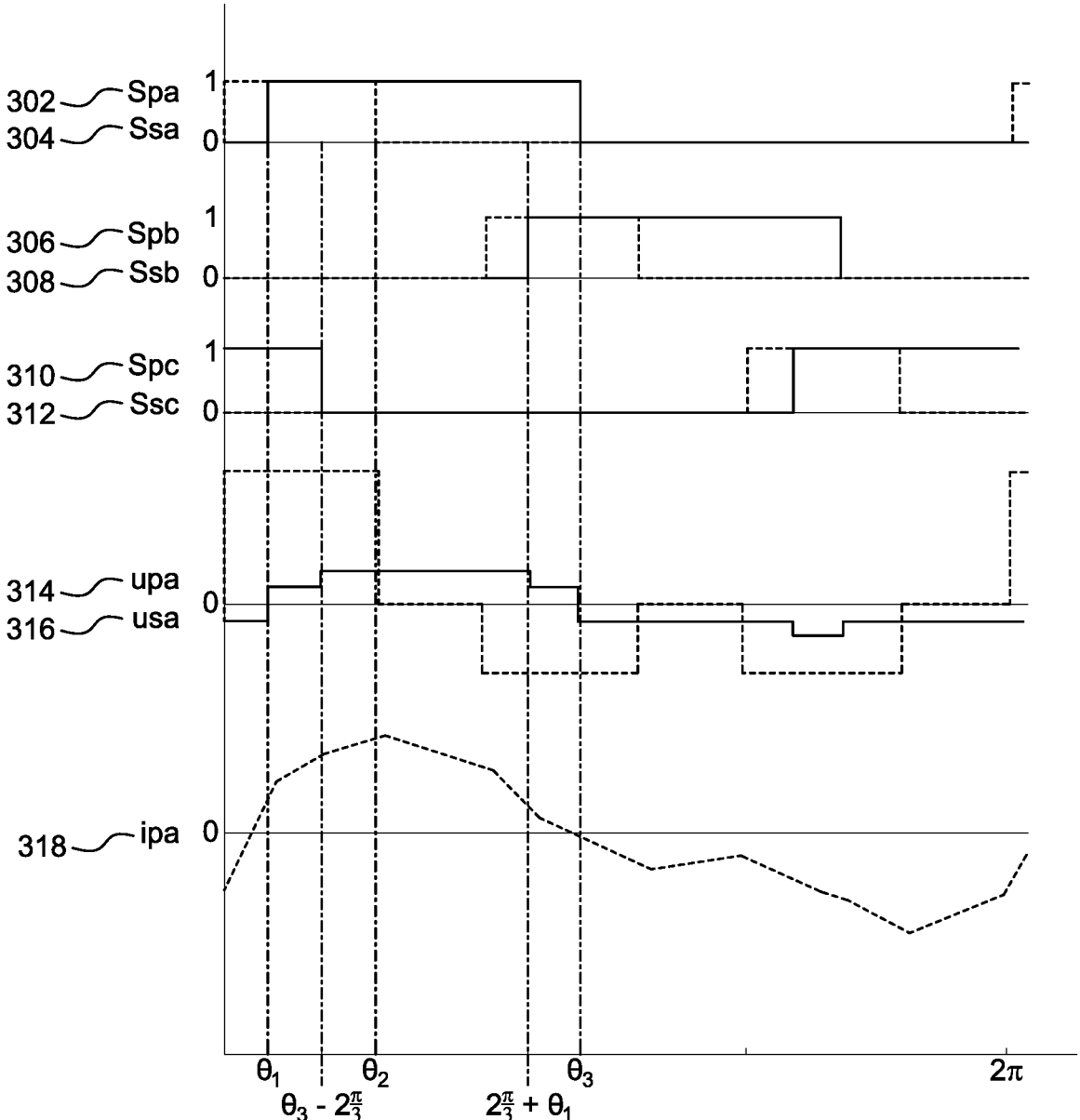
FIG. 3 illustrates waveforms of a three-phase DAB converter switching states, AC voltages, and primary AC current corresponding to a modified asymmetrical duty cycle control (MADCC), according to certain embodiments.

FIG. 3 illustrates waveforms of a three-phase DAB converter switching states, AC voltages, and primary AC current corresponding to a modified asymmetrical duty cycle control (MADCC), in certain embodiments. In this modulation technique, the values of the duty cycles $D_p$ and $D_s$ are configured to be different and independent of each other. Such configuration results in an increased number of control parameters. With more controllable parameters, more efficient controllability of the three-phase DAB converter at fault conditions is achieved. The switching states of the primary and secondary bridges for this modulation technique are illustrated in FIG. 3. Additionally, the figure shows the AC voltages of both sides of the transformer as well as the resulting AC current of the primary side of the transformer.

Referring back to FIG. 3, $S_{pa}$ 202 indicates the switching state of the first arm of the primary side bridge, where $S_{sa}$ 304 indicates the switching state of the first arm of the secondary side bridge. Similarly, the $S_{pb}$ 306 indicates the switching state of the second arm of the primary side bridge, where $S_{sab}$ 308 indicates the switching state of the second arm of the secondary side bridge. Similarly, the $S_{pc}$ 310 indicates the switching state of the third arm of the primary side bridge, where $S_{sab}$ 314 indicates the switching state of the third arm of the secondary side bridge. $U_{pa}$ 314 presents the AC voltage waveform of the primary side bridge, and $U_{sa}$ 316 presents the AC voltage waveform of the secondary side bridge. $i_{pa}$ 318 illustrates the primary AC current of the three-phase DAB corresponding to the modified asymmetrical duty cycle control method.

The duty cycle of both bridges and the load angle are represented in terms of the phase position $\theta$ as:

$$D_p = \theta_2 \qquad (7)$$

$$D_s = \theta_3 - \theta_1 \qquad (8)$$

$$\varphi = \frac{1}{2}(\theta_3 + \theta_1 - \theta_2) \qquad (9)$$

This current is a piecewise-linear phase current which can be derived for $0 \le \theta \le \theta_3$ by computing the voltage difference between the primary and secondary phase voltages as follows:

$$\text{for } 0 \le \theta \le \theta_1 \qquad (10)$$

$$i_{ap}(\theta) = \frac{U_p}{3\omega L}(2+d)\theta + i(0)$$

$$\text{for } \theta_1 \le \theta \le \theta_3 - \frac{2\pi}{3} \qquad (11)$$

$$i_{ap}(\theta) = \frac{U_p}{3\omega L}(2-d)(\theta - \theta_1) + i(\theta_1)$$

$$\text{for } \theta_3 - \frac{2\pi}{3} \le \theta \le \theta_2 \qquad (12)$$

$$i_{ap}(\theta) = \frac{2U_p}{3\omega L}(1-d)\left(\theta - \theta_3 + \frac{2\pi}{3}\right) + i\left(\theta_3 - \frac{2\pi}{3}\right)$$

$$\text{for } \theta_2 \le \theta \le \frac{2\pi}{3} \qquad (13)$$

$$i_{ap}(\theta) = -\frac{2dU_p}{3\omega L}(\theta - \theta_2) + i(\theta_2)$$

$$\text{for } \frac{2\pi}{3} \le \theta \le \frac{2\pi}{3} + \theta_1 \qquad (14)$$

$$i_{ap}(\theta) = -\frac{U_p}{3\omega L}(1+2d)\left(\theta - \frac{2\pi}{3}\right) + i\left(\frac{2\pi}{3}\right)$$

$$\text{for } \frac{2\pi}{3} + \theta_1 \le \theta \le \theta_3 \qquad (15)$$

$$i_{ap}(\theta) = -\frac{U_p}{3\omega L}(1+d)\left(\theta - \frac{2\pi}{3} - \theta_1\right) + i\left(\frac{2\pi}{3} + \theta_1\right)$$

By equating $$i(0) = -i\left(\frac{2\pi}{3}\right): \qquad (16)$$

$$i_{ap}(0) = \frac{U_p}{3\omega L}\left[-\theta_2 - d\theta_1 - \frac{1}{2}d\theta_3 + d\pi\right]$$

and after substituting $i_{ap}(0)$ in (10)-(15):

$$\text{for } 0 \le \theta \le \theta_1 \qquad (17)$$

$$i_{ap}(\theta) = \frac{U_p}{3\omega L}\left[(2+d)\theta - \theta_2 - d\theta_1 - \frac{1}{2}d\theta_3 + d\pi\right]$$

$$\text{for } \theta_1 \le \theta \le \theta_3 - \frac{2\pi}{3} \qquad (18)$$

$$i_{ap}(\theta) = \frac{U_p}{3\omega L}(2-d)\theta + d\theta_1 - \theta_2 - \frac{1}{2}d\theta_3 + d\pi$$

$$\text{for } \theta_3 - \frac{2\pi}{3} \le \theta \le \theta_2 \qquad (19)$$

$$i_{ap}(\theta) = \frac{U_p}{3\omega L}\left[2(1-d)\theta - \theta_2 + d\theta_1 + \frac{1}{2}d\theta_3 + d\frac{\pi}{3}\right]$$

$$\text{for } \theta_2 \le \theta \le \frac{2\pi}{3} \qquad (20)$$

-continued $$i_{ap}(\theta) = \frac{U_p}{3\omega L}\left[-2d\theta + \theta_2 + d\theta_1 + \frac{1}{2}d\theta_3 + d\frac{\pi}{3}\right]$$

$$\text{for } \frac{2\pi}{3} \le \theta \le \frac{2\pi}{3} + \theta_1 \quad (21)$$

$$i_{ap}(\theta) = \frac{U_p}{3\omega L}\left[-(1+2d)\theta + \theta_2 + d\theta_1 + \frac{1}{2}d\theta_3 + \frac{2\pi}{3} + d\frac{\pi}{3}\right]$$

$$\text{for } \frac{2\pi}{3} + \theta_1 \le \theta \le \theta_3 \quad (22)$$

$$i_{ap}(\theta) = \frac{U_p}{3\omega L}\left[-(1+d)\theta + \theta_2 + \frac{1}{2}d\theta_3 + \frac{2\pi}{3} - d\frac{\pi}{3}\right]$$

For Maximum output current and to realize ZCS in the secondary bridge:
i($\theta_1$)=i($\theta_3$)=0, hence and after solving:

$$2\theta_1 - \theta_2 - \frac{1}{2}d\theta_3 + d\pi = 0 \quad (23)$$

and $$\theta_2 - \theta_3 + \frac{2\pi}{3} - \frac{1}{2}d\theta_3 + d\frac{\pi}{3} = 0 \quad (24)$$

The peak phase current can be represented by:

$$i_{sDC,peak}(\theta) = i_{ap}(\theta_2) = \frac{U_p}{3\omega L}\left[\theta_2 + d\theta_1 - 2d\theta_2 + \frac{1}{2}d\theta_3 + d\frac{\pi}{3}\right] \quad (25)$$

This shows that $\theta_2$ or the duty cycle of the primary bridge $\theta_2$=$D_p$ is the effective parameter for regulating the maximum value of the transformer phase currents at fault conditions. Using the state-space averaging technique, the average output DC current is obtained:

$$\overline{i_{sDC}}(t) = \frac{U_p}{2\pi\omega L}\left(-\theta_1^2 - \theta_2^2 - \frac{1}{2}\theta_3^2 + \theta_1\theta_2 + \right. \quad (26)$$

$$\left. \theta_2\theta_3 M + \frac{2\pi}{3}\theta_3 - \frac{2\pi^2}{9} - \frac{1}{2}d\theta_3^2 - d\frac{\pi}{3}\theta_1 + d\frac{\pi}{3}\theta_3 + \frac{1}{2}d\theta_1\theta_3\right)$$

And the ratio of input-output voltage can be expressed by:
Finally, the average output power is described by:

$$\frac{U_s}{U_p} = \frac{R_L}{2\pi\omega L}\left(-\theta_1^2 - \theta_2^2 - \frac{1}{2}\theta_3^2 + \theta_1\theta_2 + \right. \quad (27)$$

$$\left. \theta_2\theta_3 + \frac{2\pi}{3}\theta_3 - \frac{2\pi^2}{9} - \frac{1}{2}d\theta_3^2 - d\frac{\pi}{3}\theta_1 + d\frac{\pi}{3}\theta_3 + \frac{1}{2}d\theta_1\theta_3\right)$$

$$P = \frac{dU_p^2}{2\pi\omega L}\left(-\theta_1^2 - \theta_2^2 - \frac{1}{2}\theta_3^2 + \theta_1\theta_2 + \right. \quad (28)$$

$$\left. \theta_2\theta_3 + \frac{2\pi}{3}\theta_3 - \frac{2\pi^2}{9} - \frac{1}{2}d\theta_3^2 - d\frac{\pi}{3}\theta_1 + d\frac{\pi}{3}\theta_3 + \frac{1}{2}d\theta_1\theta_3\right)$$

Figure 4:
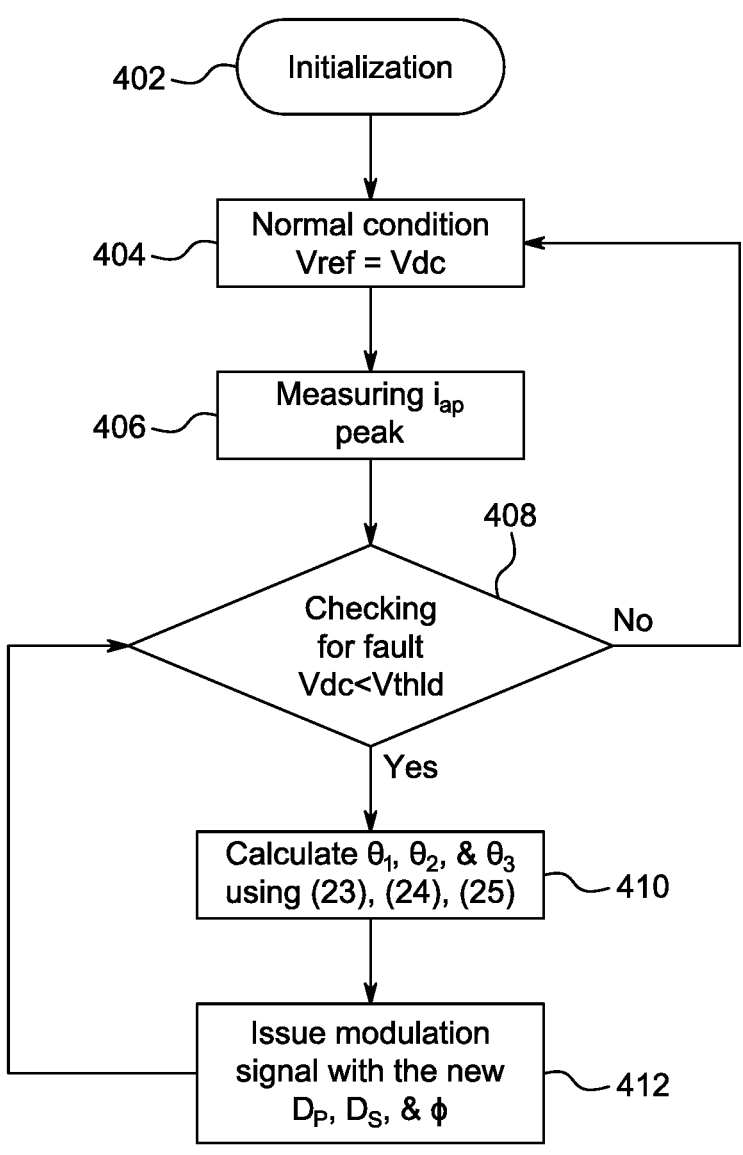
FIG. 4 illustrates the flowchart of a method for managing the operation of a three-phase dual active bridge (DAB) converter system, according to certain embodiments.

FIG. 4 illustrates the flowchart of a method for managing the operation of a three-phase dual active bridge (DAB) converter system, in certain embodiment.

At step 402, the system starts with the initialization of the three-phase DAB converter system. In this phase, the secondary side is set to match a DC output voltage to a predetermined reference voltage.

Step 404 ensures if the reference voltage $V_{ref}$ matches the DC output voltage $V_{dc}$.

Step 406 involves measuring the peak phase current in the secondary side, $i_{sDC}$, peak. The step 404 is performed to establish a reference peak current that the system will use to monitor and control the operation under normal conditions.

The DAB converter, at step 408, compares the measured DC output voltage with a pre-defined threshold voltage to ascertain the operational status of the converter. If the output voltage deviates from the threshold, it indicates a potential fault condition.

If no fault condition is detected at step 408, then the DAB converter will perform step 404 of ensuring $V_{ref}$=$V_{dc}$ again.

Upon detecting a fault condition at step 408, the DAB converter calculates the necessary parameters to respond to the fault effectively ats step 410. It determines a first duty cycle ($D_p$) for the primary side, a second duty cycle ($D_s$) for the secondary side, and a load angle ($\varphi$). These calculations are based on the voltage ratio of the three-phase DAB, the phase position, and the peak phase current.

With the duty cycles and load angle established, a modulation signal is generated and sent out at step 412. This modulation signal, predicated on the first duty cycle ($D_p$), the second duty cycle ($D_s$), and the load angle ($\varphi$), is configured to adjust the converter's power flow accordingly in light of the fault condition.

FIG. 5-FIG. 19 illustrates the DAB converter implementation in a MATLAB simulation environment, experimental setup, and results.

The MADCC technique for the modulation of the three-phase DAB converter has been validated and assessed using MATLAB Simulink. Simulations were performed under various operational conditions, both standard and fault-induced, using the parameters outlined in Table I.

TABLE I

| Simulation Parameters of the three-phase DAB Converter | |
|---|---|
| Parameter | Value |
| Primary DC voltage $U_p$ | 30 V |
| Secondary DC voltage $U_s$ | 30 V |
| Output dc-link capacitance $C_s$ | 470 µF |
| Switching frequency f | 20 kHz |
| Transformer turns ratio N | 1:1 |
| Primary leakage inductance $L_p$ | 125 µH |
| Secondary leakage inductance $L_s$ | 125 µH |

Throughout the simulations, the input DC voltage, denoted as $U_p$, was maintained at a consistent level. Under normal conditions, the system is configured to regulate the output DC voltage, $U_s$, to equal the input voltage $U_p$. In contrast, during fault conditions, the output voltage $U_s$ is subjected to change, which is contingent on the resistance presented by the fault. This simulation framework enabled a detailed analysis of the converter's operational dynamics across a spectrum of scenarios.

The SPS control technique is initially applied to govern the three-phase DAB converter under standard operational conditions, capitalizing on its inherent strength in transmitting high power. Additionally, to establish a comparative framework, the SPS method is also employed insimulating the three-phase DAB converter under fault conditions.

The subsequent disclosure confirms the functioning of the three-phase DAB with the SPS control technique, ensuring that the simulation reflects an accurate portrayal of the system's operations both under typical and fault-induced states. Following this verification, the MADCC methods can be systematically analyzed against the SPS benchmark. Such comparative analysis is performed for shedding light on the potential improvements and efficacy of the MADCC method, particularly in addressing fault scenarios and in the overall enhancement of system performance.

Figure 5:
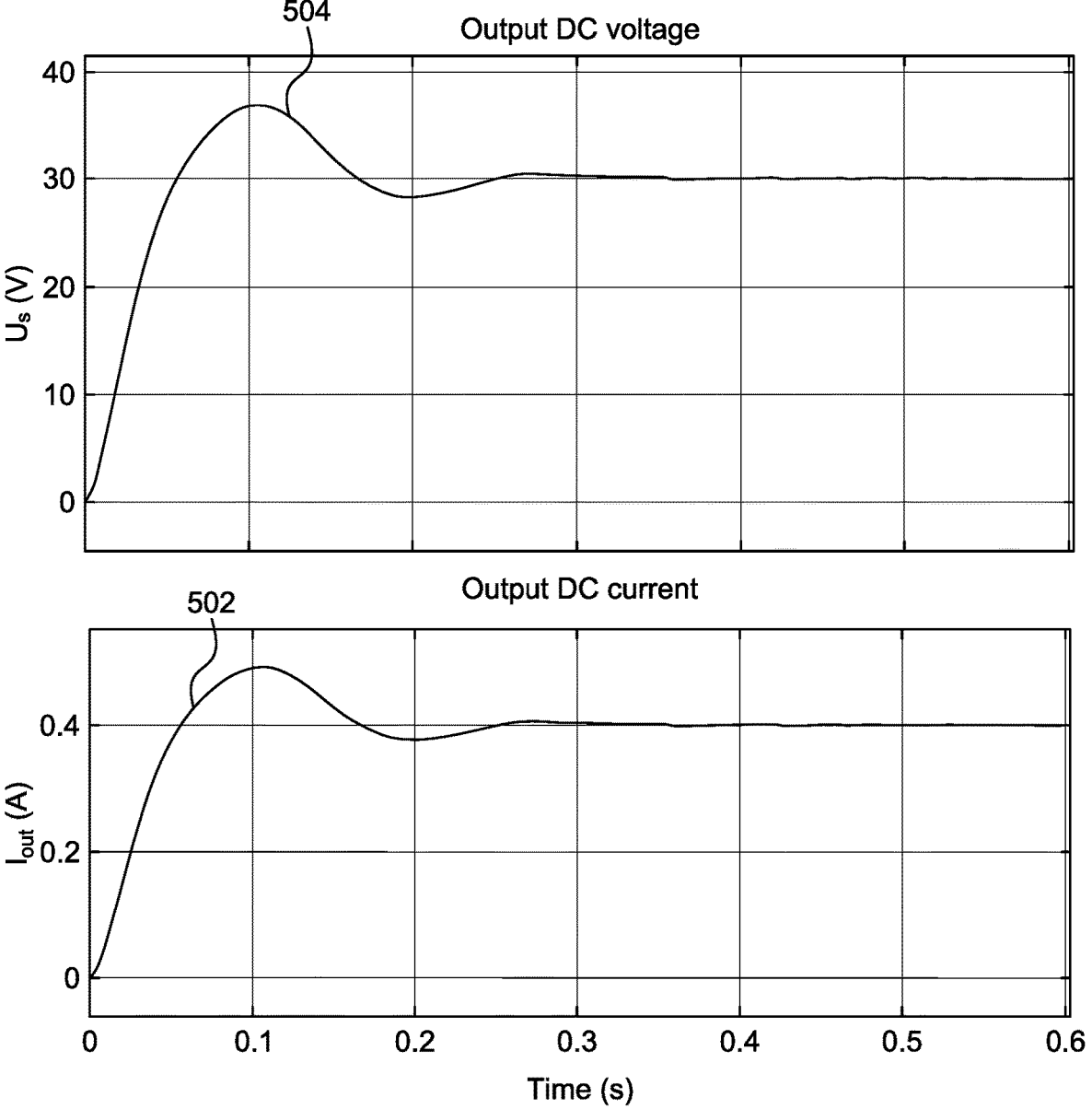
FIG. 5 illustrates the dynamic response of the DAB converter under the control of the SPS method during normal operating conditions, according to certain embodiments.

FIG. 5 illustrates the dynamic response of the DAB converter under the control of the SPS method during normal operating conditions, in certain embodiment. Specifically, waveforms of FIG. 5 indicate the SPS DC output voltage by curve 504 and current $U_s$ and $I_{out}$ by curve 502 at normal conditions. Upon initiation of the simulation, the SPS control method directs the charging of the DC-link capacitor towards the target reference voltage of 30 V.

Figure 6:
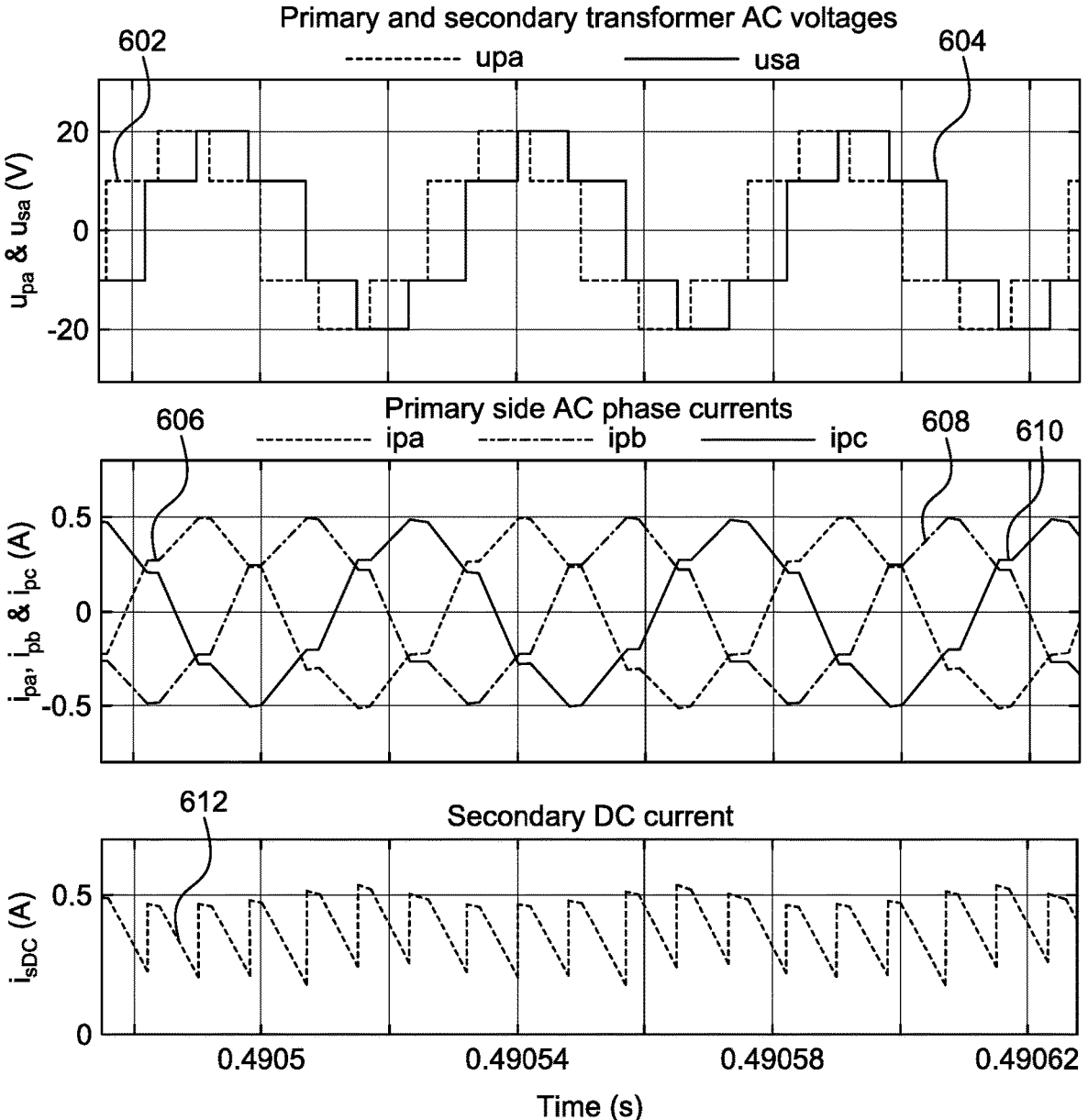
FIG. 6 illustrates SPS primary and secondary transformer AC voltages $u_{pa}$ and $u_{sa}$, primary side AC phase currents $i_{pa}$, $i_{pb}$, and $i_{pc}$, and the secondary DC current $I_{sDC}$ at normal conditions, according to certain embodiments.

FIG. 6 illustrates SPS primary and secondary transformer AC voltages $u_{pa}$ and $u_{sa}$, primary side AC phase currents $i_{pa}$, $i_{pb}$ and $i_{pc}$, and the secondary DC current $I_{SDC}$ at normal conditions, in accordance with certain embodiment. Curve 602 and curve 604 indicate the primary and secondary transformer AC voltages, $u_{pa}$ & $u_{sa}$, respectively. The primary side AC phase currents $i_{pa}$, $i_{pb}$, & $i_{pe}$ are depicted by curves 606, 608, 610, respectively. The secondary DC current $I_{SDC}$ is depicted by curve 612. These depictions affirm the steady operational state of the three-phase DAB when managed by the SPS control method. The waveforms indicate the harmonized interaction between the AC voltages and currents, confirming the system's efficiency and effectiveness in normal conditions without the presence of faults.

Figure 7:
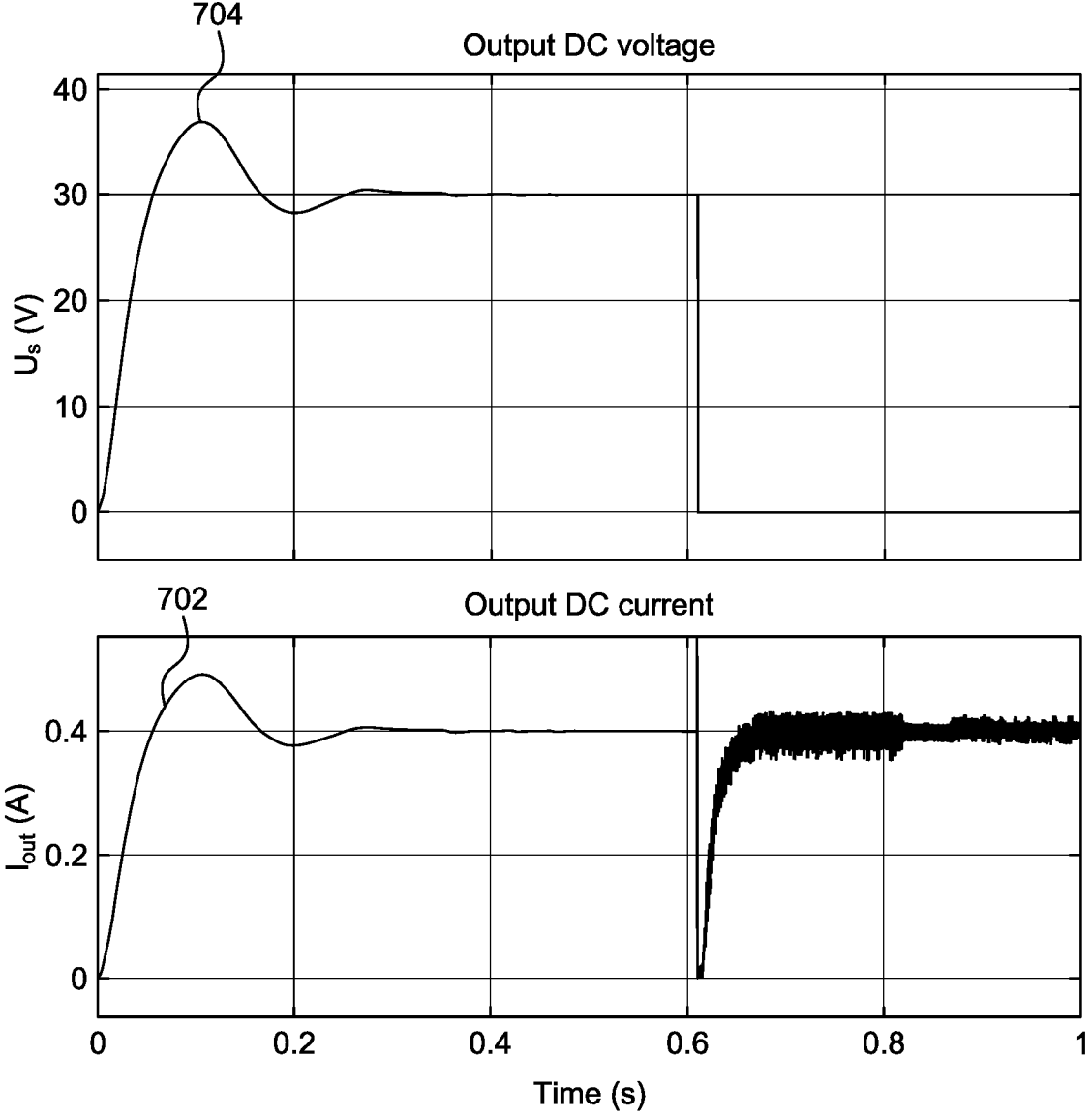
FIG. 7 illustrates SPS DC output voltage and current $U_s$ and $I_{out}$ at normal and fault conditions, according to certain embodiments.

FIG. 7 illustrates SPS DC output voltage and current $U_s$ and $I_{out}$ at normal then fault conditions, in accordance with certain embodiment. FIG. 7 addresses the behaviour of the three-phase DAB system under fault conditions, specifically when a short circuit fault is imposed across the terminals of the DC-link capacitor at a defined time instant of 0.61 seconds. Curve 704 and curve 702 indicate the transient phenomena occurring immediately after the fault induction, where the SPS control technique regulates the DC output current to the pre-set reference value of 0.4 A, mirroring the normal operational parameters. Curve 702 indicate output DC current $I_{OUT}$ and curve 704 indicate output DC voltage $U_S$ (V).

Figure 8:
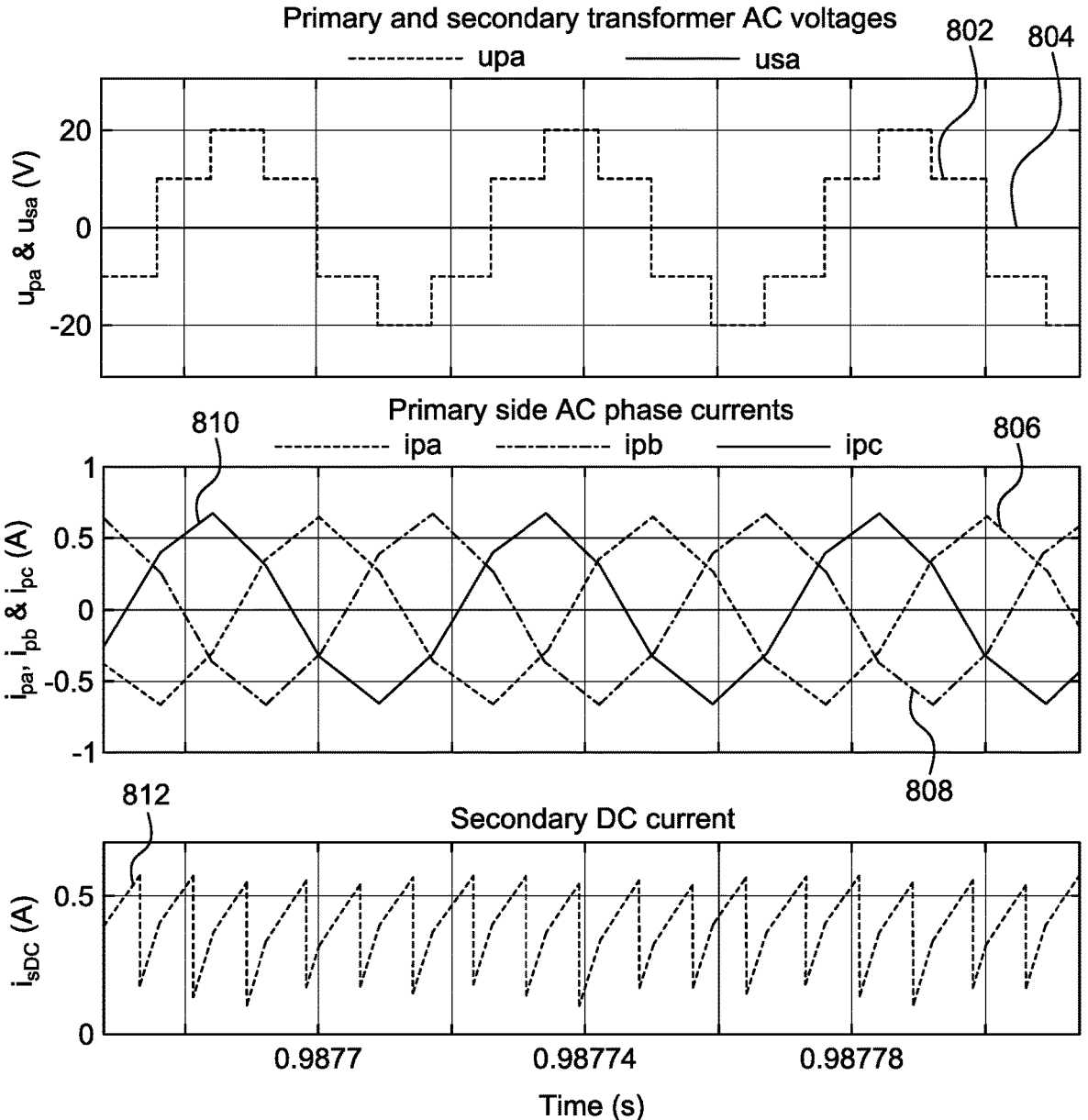
FIG. 8 shows the transformer AC primary and secondary voltages in that the secondary AC voltage collapsed to zero volt, according to certain embodiments.

FIG. 8 shows the transformer AC primary and secondary voltages in that the secondary AC voltage collapsed to zero volt, in certain embodiment. The primary transformer AC voltage $U_{pa}$ is indicated by curve 802. The secondary transformer AC voltage $U_{sa}$ is indicated by curve 804. The primary side AC phase currents $i_{pa}$, $i_{pb}$, & $i_{pc}$ are depicted by curves 806, 808, 810, respectively. The secondary DC current $I_{SDC}$ is depicted by curve 812. The waveforms show the increase in the peak value of the current from $i_{pa,peak}$=0.5 A to $i_{pa,peak,F}$=0.67 A which is one of the drawbacks of the SPS method when dealing with faults.

FIG. 8 illustrates the electrical characteristics of a three-phase dual active bridge (DAB) converter under a fault condition as indicated by the accompanying AC voltage and current waveforms. The figure particularly highlights the response of the transformer's AC primary and secondary voltages during the fault, capturing the moment when the secondary AC voltage collapses to zero volts, signalling a cessation of energy transfer on the secondary side of the transformer.

Figure 9:
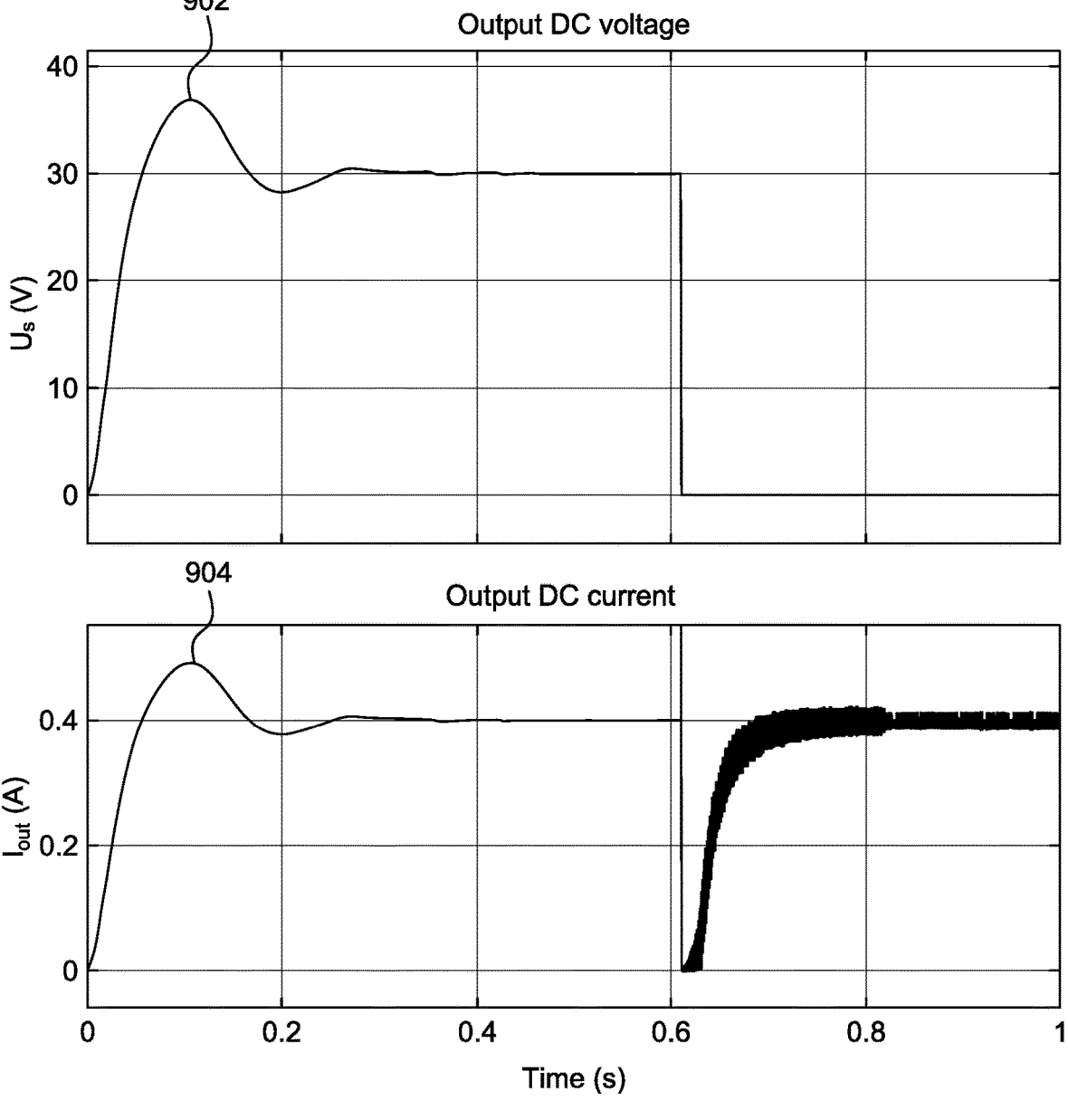
FIG. 9 illustrates the MADCC DC output voltage and current $U_s$ and $I_{out}$, according to certain embodiments.

FIG. 9 illustrates the MADCC DC output voltage and current $U_s$ and $I_{out}$, in accordance with certain embodiments. The MADCC was validated and analyzed through MATLAB Simulink circuit simulation. Initially, the three-phase DAB circuit is controlled using the SPS modulation under normal operating conditions. Subsequently, upon occurrence of a fault leading to voltage collapse, the MADCC control intervenes to regulate the three-phase DAB currents. Under normal circumstances, the peak current of the AC transformer, $i_{sDC}$, peak, is stored and utilized as a reference value for MADCC to determine appropriate control parameters. Specifically, $D_p$, $D_s$, and $\varphi$ are computed using equations (23), (24), and (25) to ensure effective control over the peak current value, maximum output current, and facilitation of soft-switching operation.

In this simulation experiment, the control parameters are derived using system parameters and MADCC equations. The duty cycles employed for the primary and secondary bridges are specified as $D_p$=25% and $D_s$=45.8%, while the load angle $\varphi$ is determined to be 1.42 radians in this case study.

The performance of the three-phase DAB converters under MADCC control during fault conditions is depicted in FIG. 9, showcasing, by curve 902, the output DC voltage subsequent to a short circuit fault occurring at t=0.61 seconds. Curve 904 indicates that the output DC current $I_{OUT}$ remains nearly constant at 0.4 A, mirroring the value attained under normal conditions.

Figure 10:
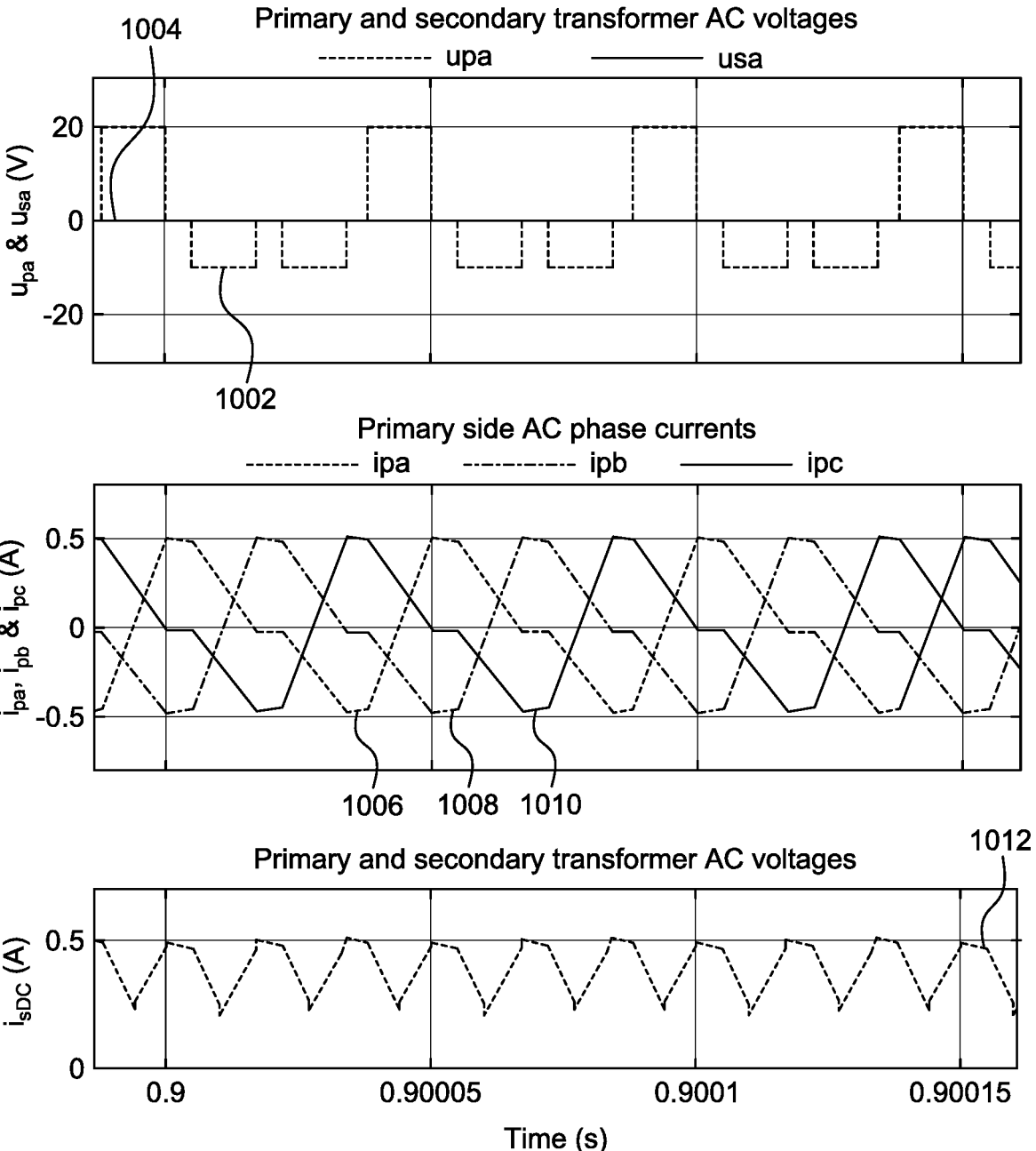
FIG. 10 shows the transformer AC primary and secondary voltages, according to certain embodiments.

FIG. 10 shows the transformer AC primary and secondary voltages, in accordance with certain embodiment. The Figure show where the secondary AC voltage has fallen to zero volt. The waveforms indicate that the current's peak value is restricted to a predetermined value, $i_{pa,peak,F}$=0.5 A. The primary transformer AC voltage $U_{pa}$ is indicated by curve 1002. The secondary transformer AC voltage $U_{sa}$ is indicated by curve 1004. The primary side AC phase currents $i_{pa}$, $i_{pb}$, and $i_{pc}$ are depicted by curves 1006, 1008, 1010, respectively. The secondary DC current $I_{SDC}$ is depicted by curve 1012.

Figure 11:
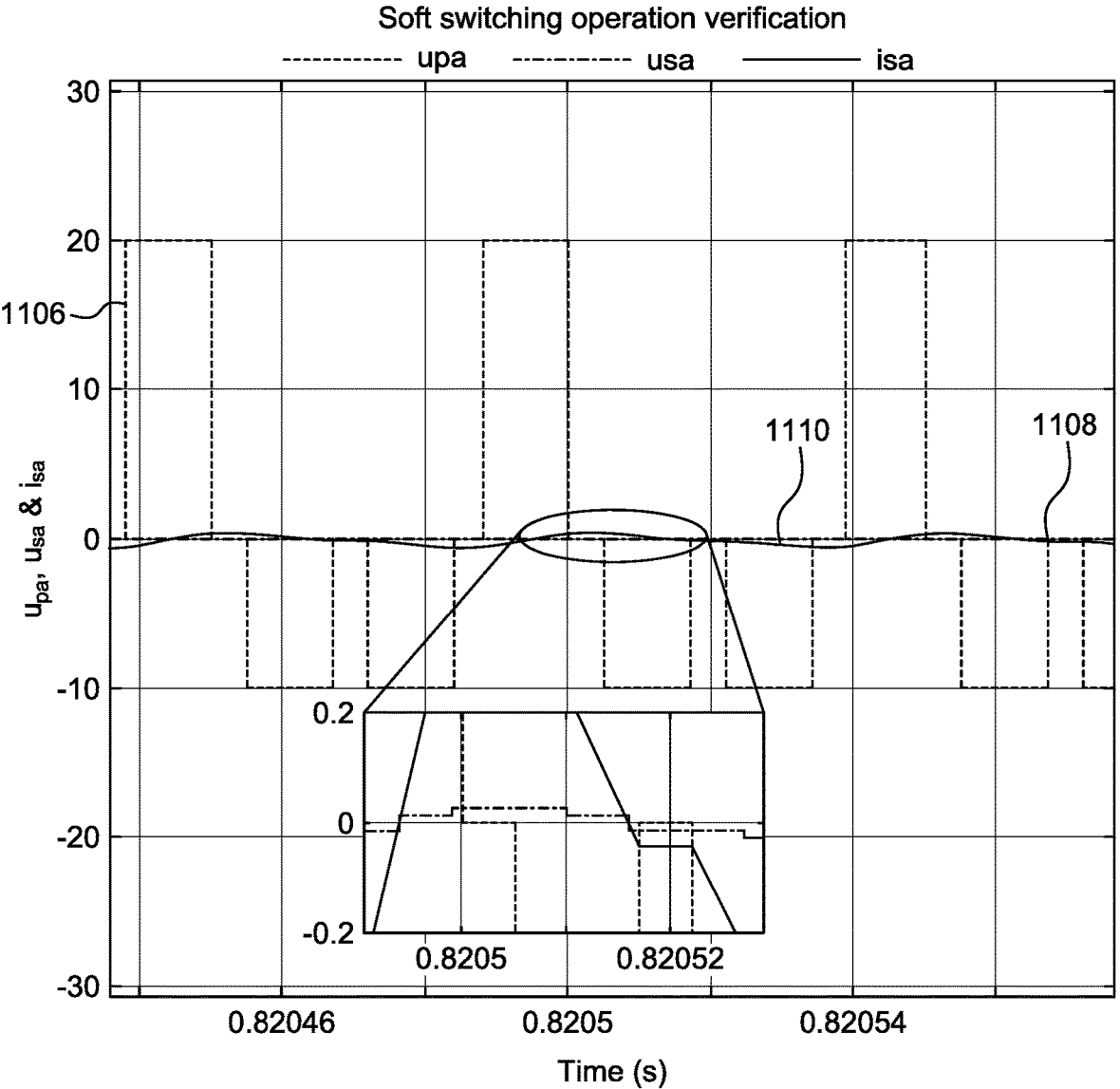
FIG. 11 illustrates a regular and zoomed view of the primary and secondary transformer AC voltages $U_{pa}$ and Usa and secondary side AC phase current $i_{sa}$ for soft switching verification, according to certain embodiments.

FIG. 11 illustrates a regular and zoomed view of the primary and secondary transformer AC voltages $U_{pa}$ and Usa and secondary side AC phase current $i_{sa}$ for soft switching verification. Soft switching operation of the three-phase DAB converter modulated using MADCC technique is verified in the simulation experiment. In the secondary bridge, all switches turn on with zero-voltage switching (ZVS) and zero-current switching (ZCS). ZVS is a technique where the power switch is turned on when the voltage across the switch is at or very near zero volts. ZCS, on the other hand, involves turning the power switch off when the current flowing through it is at or very near zero amperes. ZCS is used to reduce the turn-off losses of the switch. The switches turn off ZCS. The waveforms verify the soft switching operation of the secondary bridge by showing the waveform of the AC phase voltage and current of the secondary side of the transformer. However, the switches in the primary bridge turn on with ZVS, those switches suffer from hard turn off operation.

Figure 12:
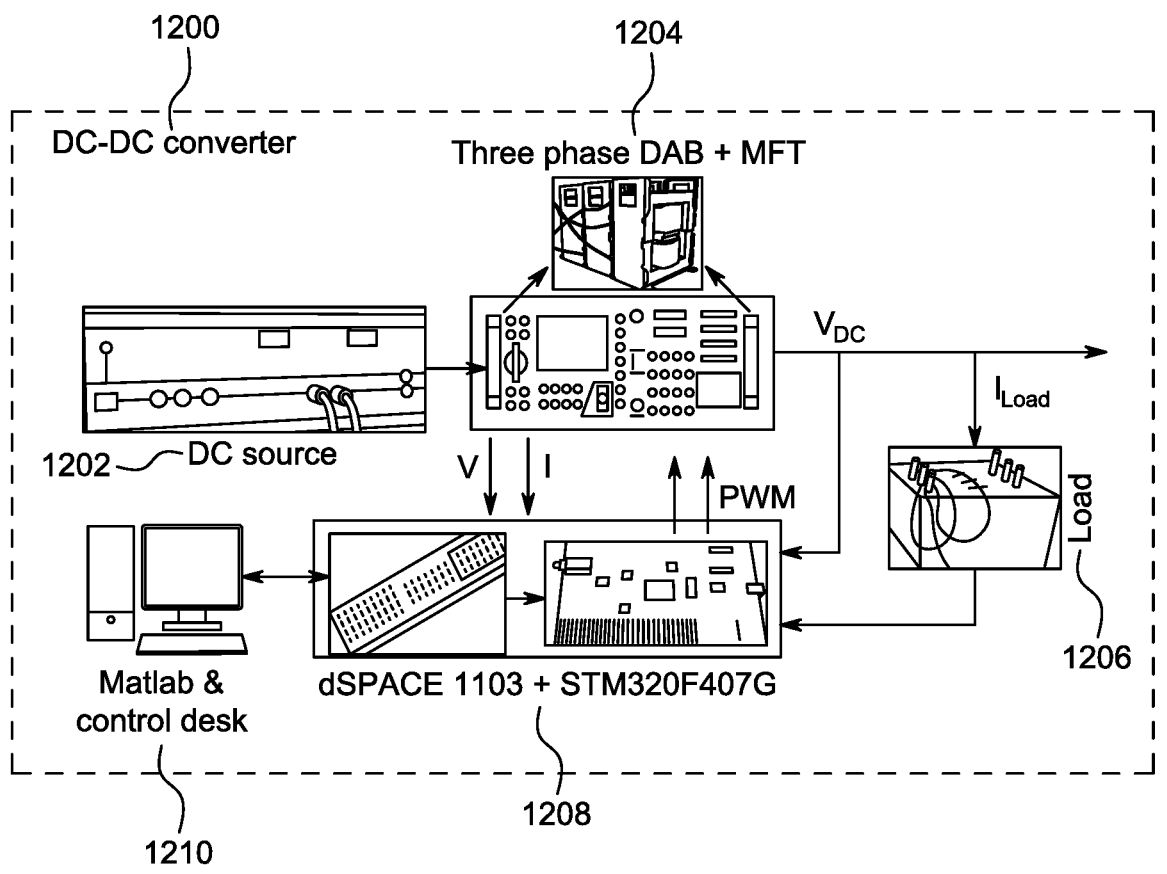
FIG. 12 depicts the block diagram of the experimental setup for the closed-loop control of a three-phase DAB converter, according to certain embodiments.

FIG. 12 depicts the block diagram of the experimental setup for the closed-loop control of a three-phase DAB converter 1204, in certain embodiment. The setup is designed to evaluate the performance of both conventional control methods and the advanced MADCC technique implemented on DC-DC converter 1200.

The setup showcases the DC source 1202, which provides the input power to the DAB converter 1204. The DAB converter 1204 is configured for transforming the DC input into a suitable form for the load 1206, indicated on the right side of the figure.

The DAB converter 1200 setup includes the control mechanism is the MATLAB & Simulink Control Desk environment 1210, which integrates seamlessly with the microcontroller(s) 1208. In one example, dSPACE 1103 1208 or similar advanced hardware, such as STM32F407/

417 microcontrollers are considered. The microcontrollers are further configured to implement the Pulse Width Modulation (PWM) for the converter operation.

Figure 13:
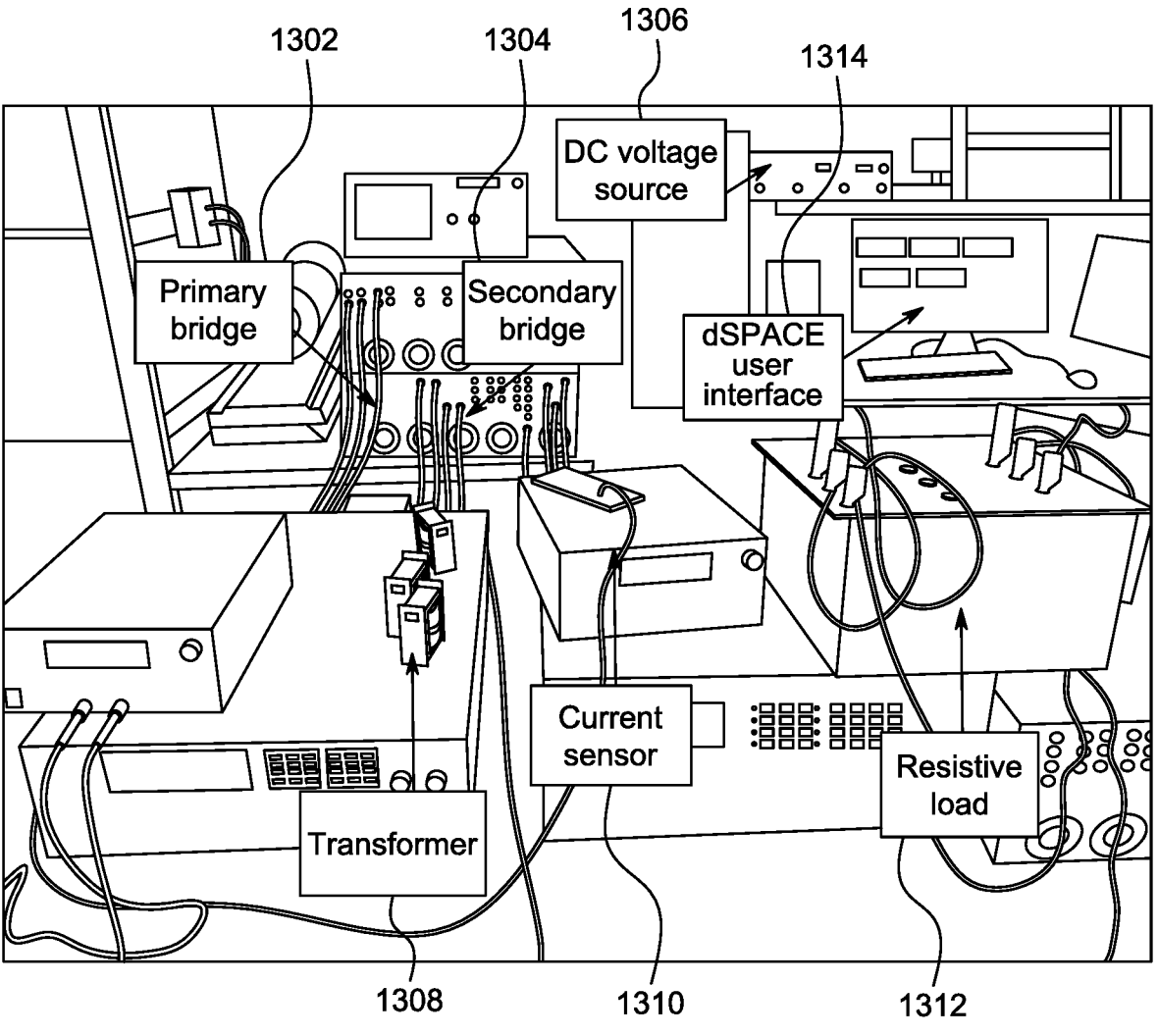
FIG. 13 illustrates the block diagram of the experimental setup for the closed-loop control of a three-phase DAB converter, according to certain embodiments.

FIG. 13 illustrates the block diagram of the experimental setup for the closed-loop control of a three-phase DAB converter, in certain embodiments. The DAB converter utilizes both conventional Single Phase Shift (SPS) and the Modified Active Damping Control (MADCC) approaches for modulation. The setup includes a down-sized laboratory prototype of the three-phase DAB converter, implementing state-of-the-art Silicon Carbide (SiC) MOSFETs as switching devices in both primary and secondary bridges.

The DAB converter includes a primary bridge 1302 and the secondary bridge 1304 linked through a transformer 1308. The input side includes a DC voltage source 1306 that supplies power to the DAB converter. For current measurements, a current sensor 1310 is implemented.

The DAB converter is controlled by a control unit which may include a digital signal processor or a microcontroller 1314 configured with the necessary software, such as MATLAB & Simulink. In one example, dSPACE 1103 1208 or similar advanced hardware, such as STM32F407/417 microcontrollers are considered. The microcontroller 1314 interfaces with the DAB converter modulating the switching actions with precision. A DC voltage load, output load, is delivered at a resistive load component 1312.

Figure 14:
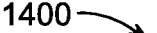
FIG. 14 is a photographic image of Medium medium-frequency three-phase transformer, according to certain embodiments.
Figure 14:
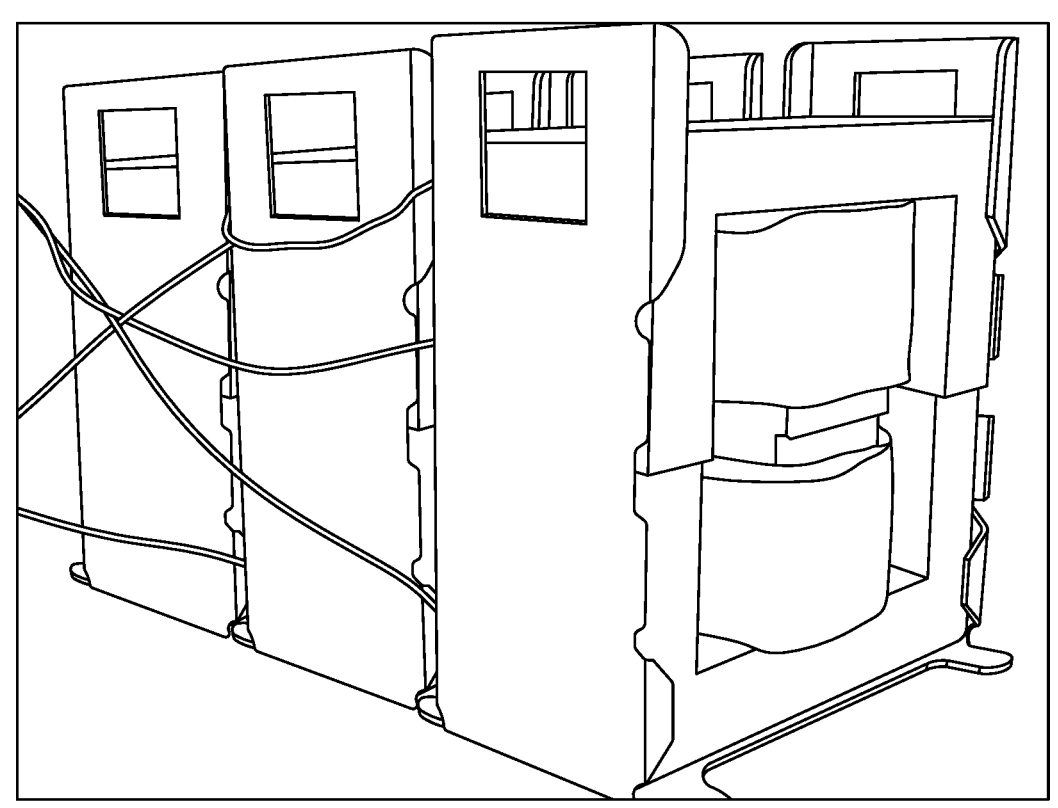

FIG. 14 is a photographic image 1400 of Medium frequency three phase transformer. The transformer is designed with windings. The E65/32/27 N27 ferrite cores and litz wire windings are used to design a three-phase transformer with a turns ratio of N=1:1, in one aspect of the present embodiment. Table II presents the specifications and experimental parameters of the prototype. The converter's control is carried out by an STM32F407 microcontroller, which utilizes a high-performance microcontroller, such as Arm® Cortex®-M4 32-bit RISC core, operating at frequencies of up to 168 MHz. The microcontroller is connected to a central digital signal processor (DSP)-based controller, enabling high-speed communications. Additionally, dSPACE was employed for measurement reading and monitoring, linked to the STM32 microcontroller.

TABLE II

Experimental Parameters of the three-phase DAB Converter

| Parameters | Value |
|---|---|
| Primary DC voltage $U_p$ | 30 V |
| Secondary DC voltage $U_s$ | 30 V |
| Output dc-link capacitance $C_s$ | 470 μF |
| Switching frequency f | 20 kHz |
| Transformer turns ration N | 1:1 |
| Transformer leakage inductance $L_\sigma$ | 250 μH |

Figure 15:
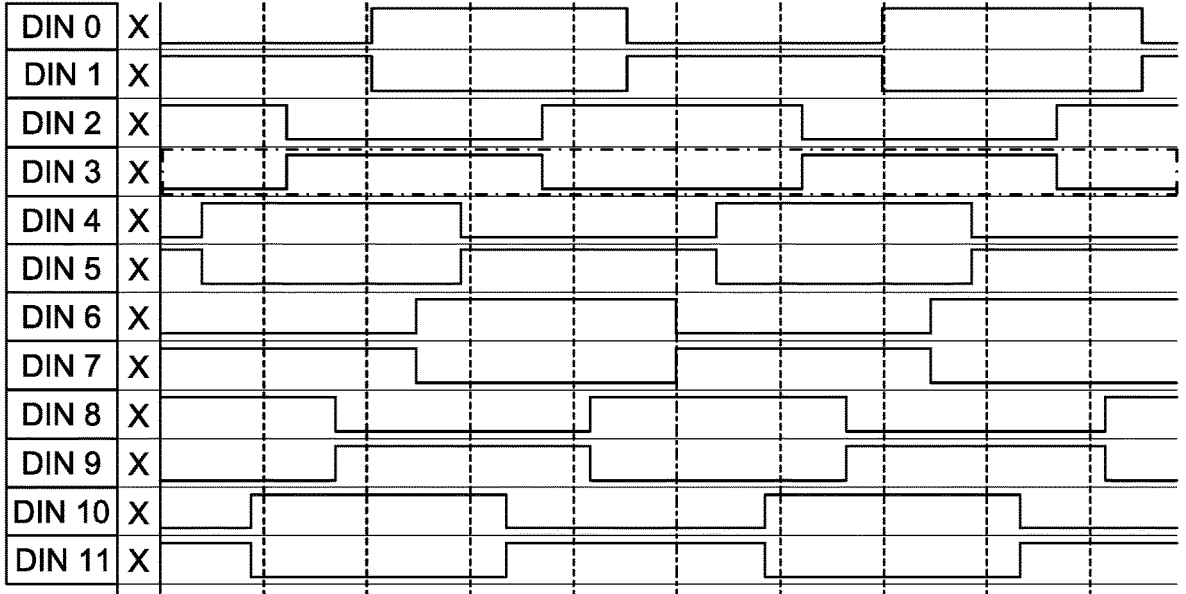
FIG. 15 illustrates a sequence of twelve phase-shifted Pulse Width Modulation (PWM) signals, according to certain embodiments.

FIG. 15 illustrates a sequence of twelve phase-shifted Pulse Width Modulation (PWM) signals, generated by an STM32F407 microcontroller at a 20 kHz switching frequency, which are utilized to control the three-phase DAB converter. These signals were captured using a digital discovery kit. The top six pulses pertain to the primary bridge converter, and the bottom six pulses correspond to the phase-shifted signals for the secondary bridge converter.

Experimentation with the MADCC has been conducted using the experimental setup described in FIG. 12 and FIG. 13. Under standard operating conditions, the three-phase DAB converter is managed using the established the SPS modulation technique. However, in the event of a fault detection, the control over the three-phase DAB transitions to the MADCC technique. During this experiment, a fault with very low resistance was introduced on the load side, precipitating a collapse in the voltage ratio to nearly zero.

Figure 16:
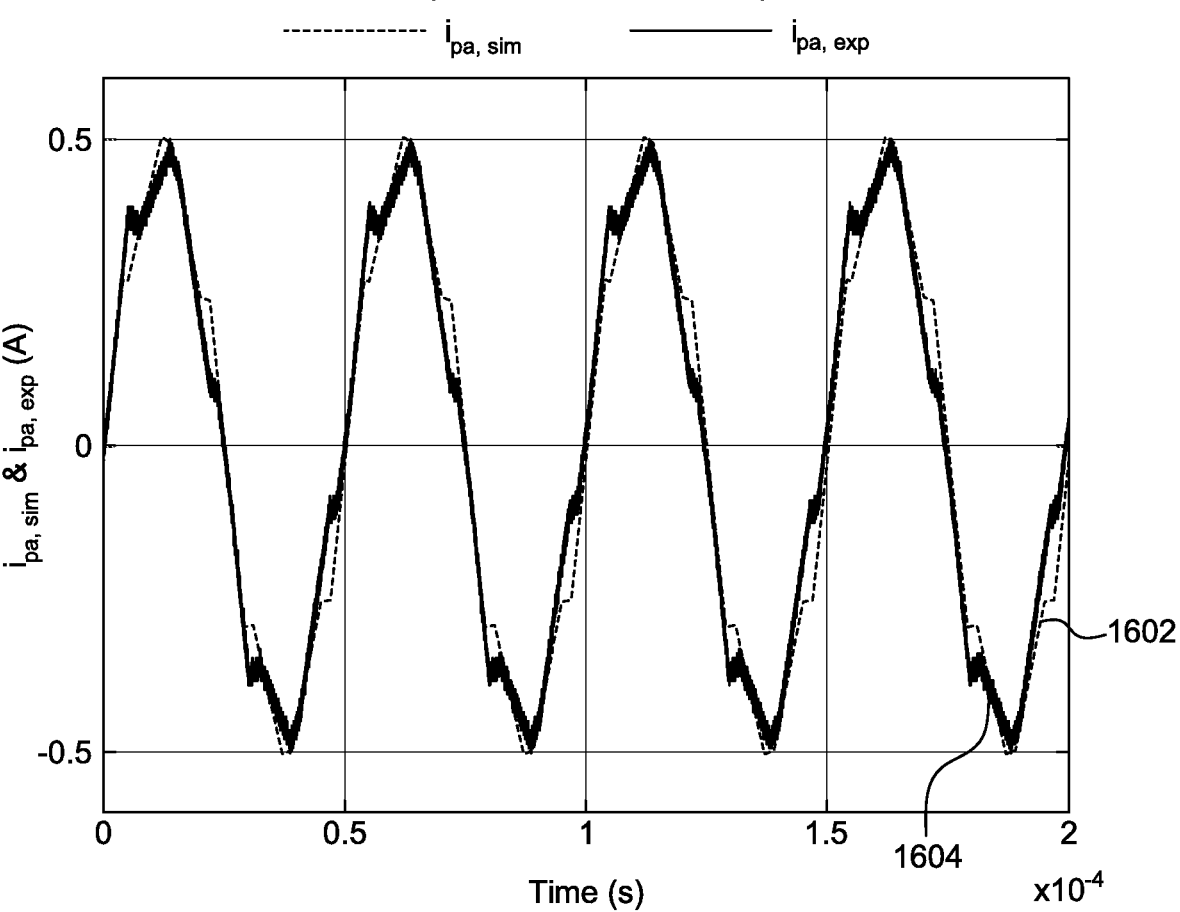
FIG. 16 illustrates a graphical representation of the comparison between the actual primary side AC current waveform of the three-phase DAB converter and the simulated waveform under the SPS control method, according to certain embodiments.

FIG. 16 illustrates a graphical representation of comparison between the actual primary side AC current waveform of the three-phase DAB converter and simulated waveform under the SPS control method. The figure verifies that the empirical waveform adheres closely to the theoretical values set by the SPS modulation in terms of shape and amplitude. Curve 1602 depicts $I_{pa,\ sim}$, which is a simulated waveform under the SPS control method. Curve 1604 depicts $I_{pa,\ exp}$ which is the actual primary side AC current waveform. This comparison validates the accuracy of the simulation model and the effective performance of the SPS method in regulating the primary side AC current under normal operational conditions.

Figure 17:
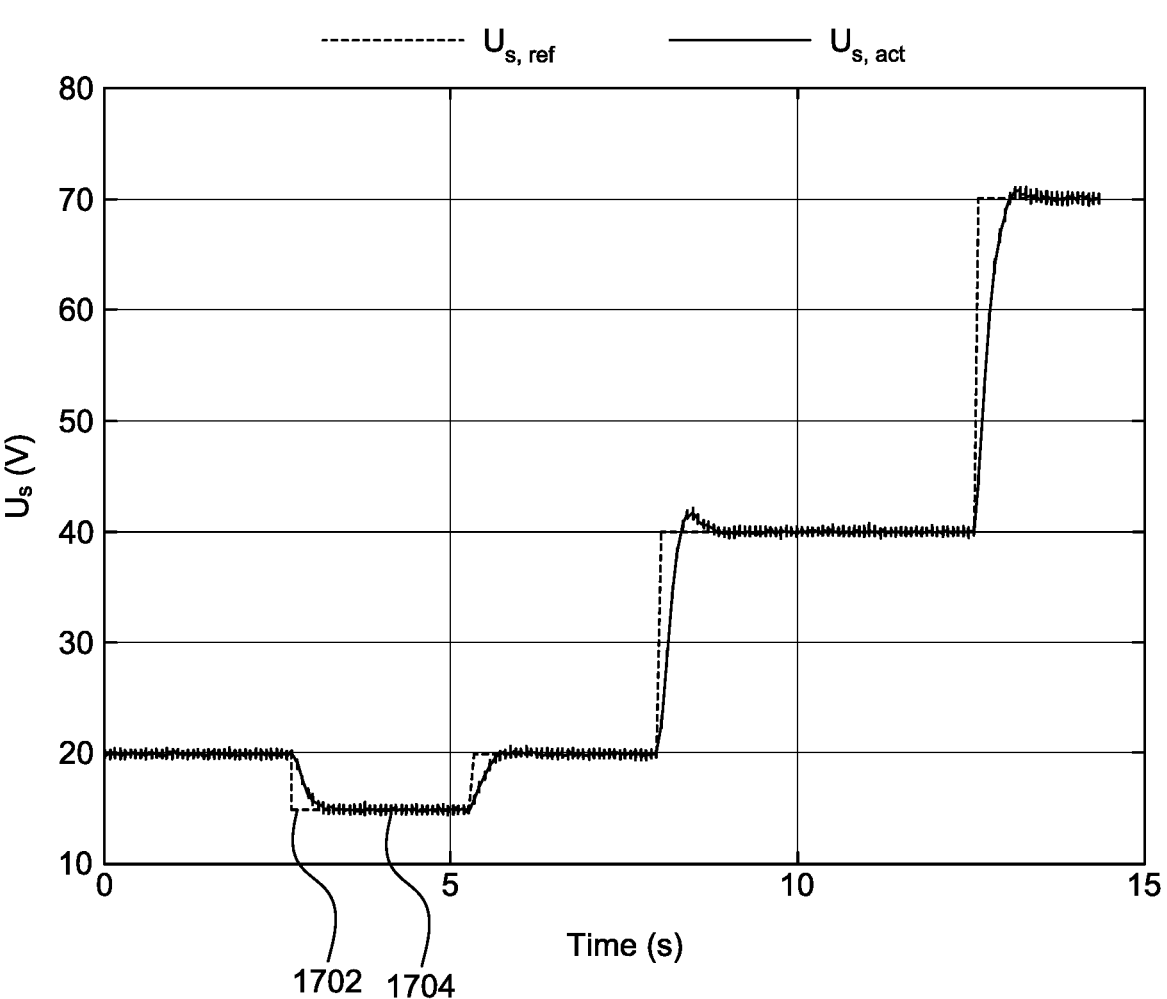
FIG. 17 presents a graphical representation of the three-phase DAB converter's output DC voltage response to varying reference values, according to certain embodiments.

FIG. 17 presents a graphical representation of the three-phase DAB converter's output DC voltage response to varying reference values. The figure illustrates the output DC voltage tracking the reference, which changes in step levels of 20, 15, 20, 40, and 70 volts. The step changes in the reference output DC voltage $U_{s,ref}$ shown by curve 1702, and the corresponding actual output DC voltage $U_{S,\ act}$, shown by curve 1704, are shown to confirm the SPS method's performance and its capacity to follow dynamic changes in the load requirements.

Figure 18:
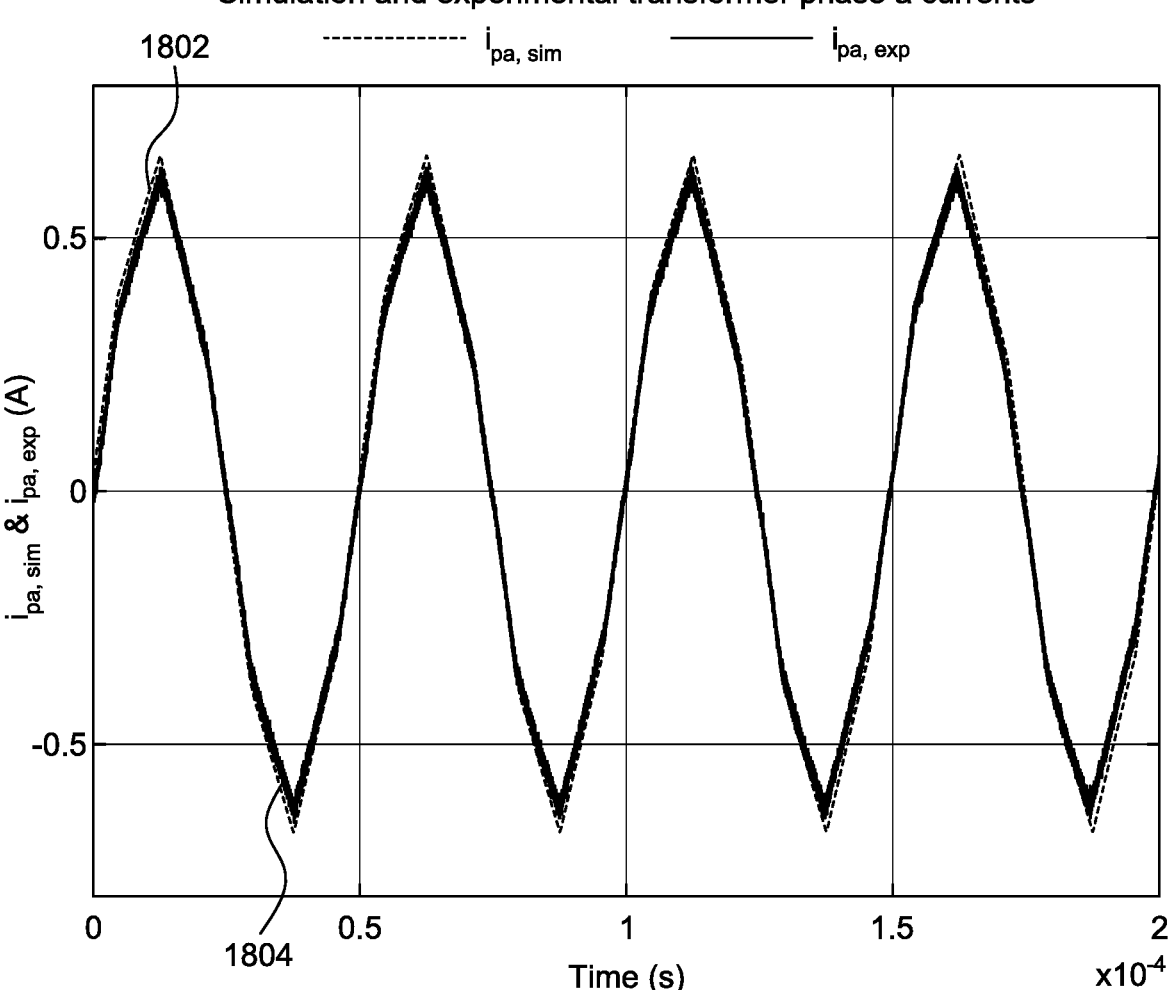
FIG. 18 illustrates the empirical waveform of the primary AC current measured post-application of a zero-voltage fault in a three-phase DAB converter system, according to certain embodiments.

FIG. 18 illustrates the empirical waveform 1802 of the primary AC current measured post-application of a zero-voltage fault in a three-phase DAB converter system. This waveform is juxtaposed with the simulated current waveform 1804, highlighting their congruence with a peak current value increment to approximately 0.67 A. Under standard conditions, the peak current value of the AC transformer, denoted as $i_{sD}$, peak, is captured and preserved as a benchmark for calibrating the MADCC to ascertain suitable control parameters.

The MADCC computes control parameters $D_p$, $D_s$, and φ through equations (23), (24), and (25), which are instrumental in ensuring precise regulation of peak current values, maximal output current, and the facilitation of soft-switching operations. Due to the experimental setup mirroring the simulation system in parameters, identical control parameters are applicable in both experimental and simulated environments. For this specific case study, the duty cycles employed for the primary and secondary bridges are established as $D_p$=25% and $D_s$=45.8%, respectively, with the load angle φ set at 1.42 radians.

The measurement of the primary side AC phase current provides empirical evidence to assess the performance of the MADCC control approach. This data is critical for an experimental examination and substantiates the efficacy of the MADCC in managing the converter's operations.

Figure 19:
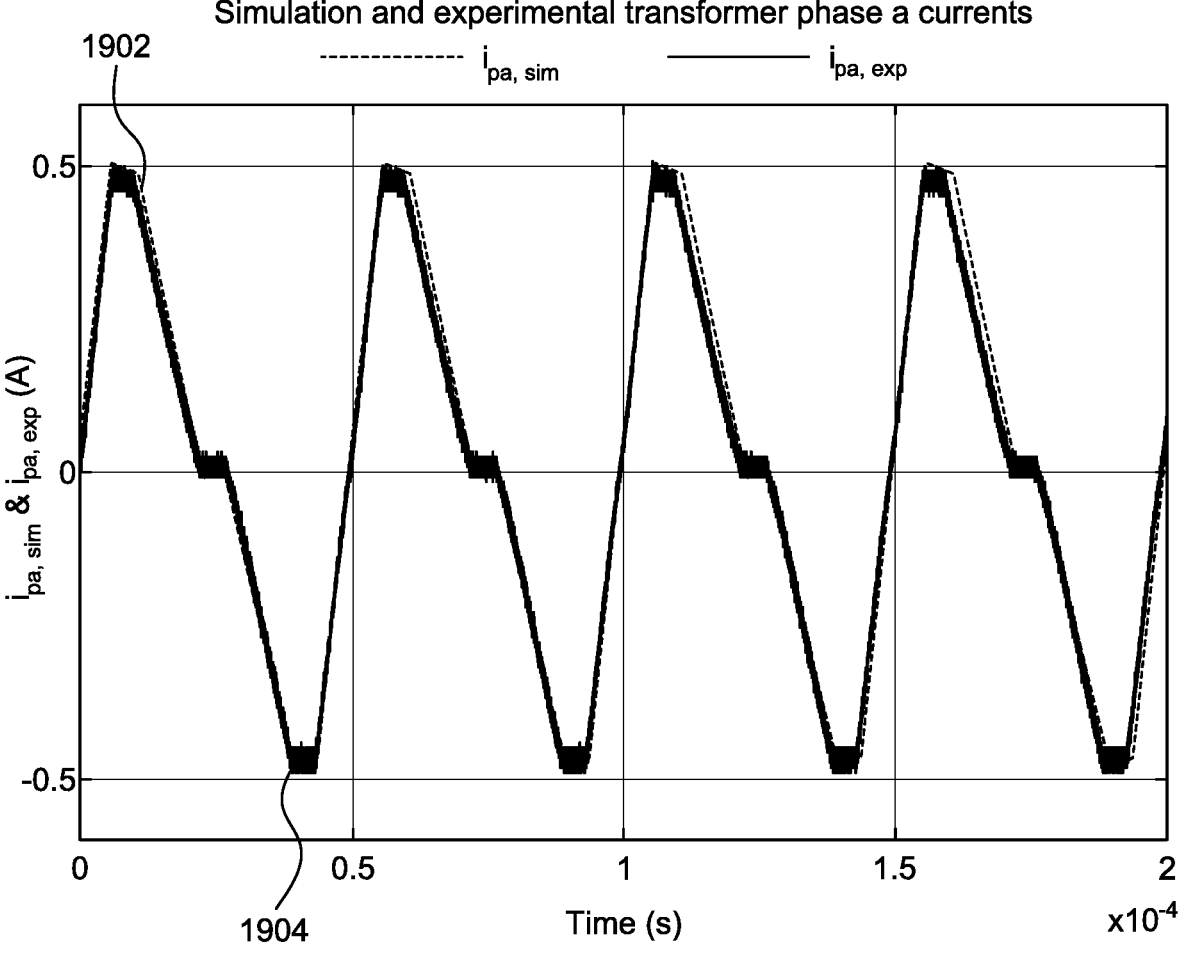
FIG. 19 illustrates a graphical representation of the comparison between the primary side AC phase current and the simulation stage, according to certain embodiments.

FIG. 19 illustrates a graphical representation of comparison between the primary side AC phase current and the simulation stage. The figure shows that the current's peak value is restricted to the predetermined value, $i_{pa,peak,F}$=0.5 A. In addition, the output DC current $I_{sDC}$ was measured to be 0.4 A which is the same current value as in the normal condition. As shown in the FIG. 19, the measured waveform of the AC current has almost the same shape and values to that obtained in the simulation results a with small range of inaccuracy caused by the used measurements devices. Curve 1902 depicts $I_{pa,\ sim}$, which is a simulated waveform. Curve 1904 depicts $I_{pa,\ exp}$ which is the actual primary side AC current waveform.

Numerous modifications and variations of the present disclosure are possible in light of the above teachings. It is therefore to be understood that within the scope of the appended claims, the invention may be practiced otherwise than as specifically described herein.

The invention claimed is:

1. A method to control a three-phase dual active bridge converter system having a primary side and a secondary side, comprising:

initializing the three-phase dual active bridge converter system to make a DC output voltage in the secondary side equal to a reference voltage;

measuring a peak phase current in the secondary side ($i_{sDC,\ peak}$) to obtain a reference peak current in a normal operation condition;

measuring and comparing the DC output voltage to a threshold voltage to determine a fault condition;

calculating a first duty cycle ($D_p$), a second duty cycle ($D_s$), and a load angle ($\varphi$) based on a three-phase dual active bridge voltage ratio, a phase position, and the peak phase current; and sending a modulation signal based on the first duty cycle, the second duty cycle, and the load angle in response to the fault condition to control a power flow of the three-phase dual active bridge converter system;

wherein the first duty cycle is independent from the second duty cycle.

2. The method of claim 1, wherein the calculating the first duty cycle further comprises:

calculating the first phase angle ($\theta_1$), the second phase angle ($\theta_2$), and the third phase angle ($\theta_3$) based on a first equation, a second equation, and a third equation, wherein:

$$\text{the first equation is } 2\theta_1 - \theta_2 - \frac{1}{2}d\theta_3 + d\pi = 0;$$

$$\text{the second equation is } \theta_2 - \theta_3 + \frac{2\pi}{3} - \frac{1}{2}d\theta_3 + d\frac{\pi}{3} = 0; \text{ and}$$

$$\text{the third equation is } i_{sDC,peak}(\theta) = \frac{U_p}{3\omega L}\left[\theta_2 + d\theta_1 - 2d\theta_2 + \frac{1}{2}d\theta_3 + d\frac{\pi}{3}\right];$$

wherein d is the three-phase dual active bridge voltage ratio, $U_p$ is a primary DC voltage, $\omega$ is an angular switching frequency, and $\theta$ is a phase angle; and calculating the first duty cycle ($D_p$), the second duty cycle ($D_s$), and the load angle ($\varphi$) based on a fourth equation, a fifth equation, and a sixth equation, wherein:

$$\text{the fourth equation is } D_p = \theta_2;$$

$$\text{the fifth equation is } D_s = \theta_3 - \theta_1; \text{ and}$$

$$\text{the sixth equation is } \varphi = \frac{1}{2}(\theta_3 + \theta_1 - \theta_2).$$

3. The method of claim 2, wherein the three-phase dual active bridge converter system is controlled by a single-phase shift control method under a normal operation condition.

4. The method of claim 1, wherein the three-phase dual active bridge converter system has a plurality of switches, wherein each of the plurality of switches includes a soft-switching technique.

5. The method of claim 1, wherein the three-phase dual active bridge system further comprises a three-phase medium-frequency transformer having a winding configuration configured to link the primary side bridge and the secondary side bridge and a microcontroller.

6. The method of claim 1, wherein the modulation signal is configured to restrict the power flow represented by a primary side AC phase current less than a predetermined current limit.

7. A three-phase dual active bridge converter, comprising:

a primary side bridge;

a secondary side bridge;

a three-phase medium-frequency transformer having a winding configuration configured to link the primary side bridge and the secondary side bridge; and a microcontroller configured to modulate a power flow of the three-phase dual active bridge converter by a modulation method, comprising:

initializing the three-phase dual active bridge converter system make a DC output voltage of the secondary side bridge is equal to a reference voltage;

measuring a peak phase current of the secondary side bridge ($i_{sDC,peak}$) to obtain a reference peak current in a normal operation condition;

measuring and comparing the DC output voltage to a threshold voltage to determine a fault condition;

calculating a first duty cycle ($D_p$), a second duty cycle ($D_s$), and a load angle ($\varphi$) based on a three-phase dual active bridge voltage ratio, a phase position, and the peak phase current; and sending a modulation signal based on the first duty cycle, the second duty cycle, and the load angle in response to the fault condition to modulate the power flow;

wherein the first duty cycle is independent from the second duty cycle.

8. The three-phase dual active bridge converter of claim 7, wherein calculating the first duty cycle further comprising:

calculating the first phase angle ($\theta_1$), the second phase angle ($\theta_2$), and the third phase angle ($\theta_3$) based on a first equation, a second equation, and a third equation, wherein:

$$\text{the first equation is } 2\theta_1 - \theta_2 - \frac{1}{2}d\theta_3 + d\pi = 0;$$

$$\text{the second equation is } \theta_2 - \theta_3 + \frac{2\pi}{3} - \frac{1}{2}d\theta_3 + d\frac{\pi}{3} = 0; \text{ and}$$

$$\text{the third equation is } i_{sDC,peak}(\theta) = \frac{U_p}{3\omega L}\left[\theta_2 + d\theta_1 - 2d\theta_2 + \frac{1}{2}d\theta_3 + d\frac{\pi}{3}\right];$$

wherein d is the three-phase dual active bridge voltage ratio, $U_p$ is a primary DC voltage, $\omega$ is an angular switching frequency, and $\theta$ is a phase angle; and calculating the first duty cycle, the second duty cycle, and the load angle based on a fourth equation, a fifth equation, and a sixth equation, wherein:

$$\text{the fourth equation is } D_p = \theta_2;$$

$$\text{the fifth equation is } D_s = \theta_3 - \theta_1; \text{ and}$$

$$\text{the sixth equation is } \varphi = \frac{1}{2}(\theta_3 + \theta_1 - \theta_2).$$

9. The three-phase dual active bridge converter of claim 8, wherein the modulation method is a single-phase shift control method under a normal operation condition.

10. The three-phase dual active bridge converter of claim 7, wherein the three-phase dual active bridge converter system has a plurality of switches, wherein each of the plurality of switches includes a soft-switching technique.

11. The three-phase dual active bridge converter of claim 10, wherein the soft-switching technique comprising a zero-voltage switching and a zero-current switching.

12. The three-phase dual active bridge converter of claim 7, wherein the modulation signal is configured to restrict a primary side AC phase current less than a predetermined current limit.

13. The three-phase dual active bridge converter of claim 7, wherein the winding configuration is selected from the group consists of a Y/Y, a $\Delta/\Delta$, and a Y/$\Delta$.

14. The three-phase dual active bridge converter of claim 13, wherein the winding configuration is the Y/Y.

15. The three-phase dual active bridge converter of claim 7, wherein the microcontroller further comprises a central digital signal processor-based controller.

\* \* \* \* \*